US009027788B2

(12) United States Patent
Ophardt et al.

(10) Patent No.: US 9,027,788 B2
(45) Date of Patent: May 12, 2015

(54) FLUID LEVEL GAUGE

(71) Applicant: GOTOHTI.COM INC., Beamsville (CA)

(72) Inventors: Heiner Ophardt, Arisdorf (CH); Edward House, Ontario (CA); Cuneyt Tezcan, Guelph (CA); Dusan Stan, Stoney Creek (CA)

(73) Assignee: GOTOHTI.COM INC., Beamsville (CA)

( * ) Notice: Subject to any disclaimer, the term of this patent is extended or adjusted under 35 U.S.C. 154(b) by 0 days.

(21) Appl. No.: 14/167,358

(22) Filed: Jan. 29, 2014

(65) Prior Publication Data

US 2014/0144934 A1    May 29, 2014

Related U.S. Application Data

(63) Continuation of application No. 13/464,516, filed on May 4, 2012, now abandoned.

(30) Foreign Application Priority Data

May 6, 2011    (CA) ..................................... 2739362

(51) Int. Cl.
  *B67D 7/22*    (2010.01)
  *A47K 5/12*    (2006.01)
  *G01F 23/292*    (2006.01)

(52) U.S. Cl.
  CPC .............. *B67D 7/221* (2013.01); *A47K 5/1205* (2013.01); *G01F 23/2928* (2013.01); *G01F 23/2921* (2013.01); *G01F 23/2927* (2013.01)

(58) Field of Classification Search
  CPC ... A47K 5/1205; B67D 7/221; G01F 23/2921
  USPC ......... 222/23, 41, 64, 95, 52–63, 65–69, 107, 222/180–185.1; 250/577
  See application file for complete search history.

(56) References Cited

U.S. PATENT DOCUMENTS

| | | | | |
|---|---|---|---|---|
| 3,238,978 | A * | 3/1966 | De Frenne | 141/1 |
| 3,273,752 | A * | 9/1966 | Horeczky | 222/52 |
| 3,677,652 | A * | 7/1972 | Little | 250/339.09 |
| 4,193,004 | A * | 3/1980 | Lobdell et al. | 250/577 |
| 4,246,489 | A * | 1/1981 | Yoshida et al. | 250/577 |
| 4,311,048 | A * | 1/1982 | Merz | 73/293 |
| 4,440,022 | A * | 4/1984 | Masom | 73/293 |
| 4,733,095 | A * | 3/1988 | Kurahashi et al. | 250/577 |
| 4,788,444 | A * | 11/1988 | Williams | 250/577 |
| 4,870,292 | A * | 9/1989 | Alpert et al. | 250/577 |
| 4,967,935 | A * | 11/1990 | Celest | 222/52 |
| 5,836,482 | A * | 11/1998 | Ophardt et al. | 222/325 |
| 5,852,946 | A * | 12/1998 | Cowger | 73/293 |
| 6,118,134 | A * | 9/2000 | Justak | 250/577 |
| 6,305,404 | B1 * | 10/2001 | Steiger | 137/242 |
| 6,606,053 | B2 * | 8/2003 | Fehrenbach et al. | 342/124 |
| 6,640,628 | B2 * | 11/2003 | Lutke et al. | 73/290 V |

(Continued)

*Primary Examiner* — Paul R Durand
*Assistant Examiner* — Randall Gruby
(74) *Attorney, Agent, or Firm* — Thorpe North & Western, LLP

(57) ABSTRACT

A fluid level gauging mechanism external of a reservoir bottle in a dispenser which mechanism emits electromagnetic radiation and senses the electromagnetic radiation emitted which passes through the bottle or is reflected from the bottle through a wall of the bottle into the bottle at a first height and senses reflected radiation passing outwardly from the bottle at a second different height.

18 Claims, 32 Drawing Sheets

(56) References Cited

U.S. PATENT DOCUMENTS

| | | | |
|---|---|---|---|
| 7,199,388 B2* | 4/2007 | Omatoi | 250/573 |
| 7,467,548 B2* | 12/2008 | Fredriksson | 73/304 R |
| 7,649,189 B2* | 1/2010 | Cole | 250/573 |
| 8,044,844 B2* | 10/2011 | Nyberg | 342/124 |
| 8,081,069 B2* | 12/2011 | Haueter et al. | 340/500 |
| 8,322,571 B2* | 12/2012 | Hovinen et al. | 222/65 |
| 8,338,811 B2* | 12/2012 | Lang et al. | 250/577 |
| 2001/0038019 A1* | 11/2001 | Vincent et al. | 222/95 |
| 2006/0123901 A1* | 6/2006 | Ramus et al. | 73/290 R |
| 2006/0219962 A1* | 10/2006 | Dancs et al. | 250/577 |
| 2006/0261083 A1* | 11/2006 | Ophardt et al. | 222/1 |
| 2007/0034643 A1* | 2/2007 | Keyes et al. | 222/64 |
| 2008/0112830 A1* | 5/2008 | Ophardt et al. | 417/547 |
| 2008/0121663 A1* | 5/2008 | Ophardt et al. | 222/309 |
| 2008/0233012 A1* | 9/2008 | Zander | 422/99 |
| 2009/0101671 A1* | 4/2009 | Cittadino et al. | 222/23 |
| 2009/0114679 A1* | 5/2009 | Ophardt et al. | 222/105 |
| 2010/0020322 A1* | 1/2010 | De Vries et al. | 356/338 |
| 2011/0017769 A1* | 1/2011 | Ophardt | 222/1 |
| 2011/0107853 A1* | 5/2011 | Studer | 73/862.381 |
| 2011/0108410 A1* | 5/2011 | Ophardt | 204/157.44 |
| 2012/0314059 A1* | 12/2012 | Hoffmann et al. | 348/135 |
| 2013/0119083 A1* | 5/2013 | Ophardt et al. | 222/64 |
| 2014/0217123 A1* | 8/2014 | Ophardt et al. | 222/190 |
| 2014/0239203 A1* | 8/2014 | UMEDA et al. | 250/504 R |
| 2014/0319181 A1* | 10/2014 | Tremel | 222/207 |

* cited by examiner

FLUID LEVEL GAUGE

RELATED APPLICATION

This application is a continuation of co-pending U.S. patent application Ser. No. 13/464,516 filed May 4, 2012 and claims the benefit of 35 U.S.C. 120.

SCOPE OF THE INVENTION

This invention relates to fuel level gauges and, more particularly, to fuel level gauges external to a removable fluid containing bottle in a fluid dispenser.

BACKGROUND OF THE INVENTION

Fluid dispensers are well known for dispensing hand cleaning fluids as may be provided, for example, in washrooms and hospitals. Examples of such dispensers include those disclosed in U.S. Patent Publication US 2008/0121663 to Ophardt et al, published May 29, 2008; U.S. Patent Publication US 2010/0288788 to Ophardt published Nov. 18, 2010; U.S. Patent Publication US 2011/0017769 to Ophardt published Jan. 27, 2011; U.S. Patent Publication US 2007/0158363 to Ophardt published Jul. 12, 2007 and U.S. Patent Publication US 2010/0147879 to Ophardt et al published Jun. 17, 2010, the disclosures of which are incorporated herein by reference. With such dispensers, as fluid from the reservoir bottle is used up, the fluid needs to be replaced as by removing and replacing an empty bottle with a bottle which is filled with fluid.

Previously known automated mechanisms for determining the fluid level in the reservoir bottle include counters to count the number of times that a dispensing mechanism is activated and calculating with an estimation of the approximate dosage of each activation, the fluid dispensed to determine when a bottle of a given volume may be considered empty. Such prior art mechanisms suffer the disadvantage that they require monitoring of the volume of fluid in each bottle, monitoring of removal and attachment of a bottle and maintaining a count of the number of activations in order to estimate when a bottle is empty. Such arrangements have been found to be disadvantageous notably in manually operated dispensers as requiring an arrangement for the counting mechanism to be coupled to the pump mechanism. Such arrangements also have the disadvantageous in manually operated and automatic dispensers in requiring recognition as to when a bottle has been coupled to the dispenser, and recognition when a bottle that is coupled to the dispenser is full so as to represent an initiation point for counting. Such arrangements have been found to be disadvantageous in providing a requirement for having bottle sensing arrangements separate from mechanisms which may recognize the activation of the pump.

SUMMARY OF THE INVENTION

To at least partially overcome these disadvantages of previously known devices, the present invention provides a fluid level gauging mechanism external of a reservoir bottle in a dispenser which mechanism emits electromagnetic radiation and senses the electromagnetic radiation emitted which is reflected from the bottle.

An object of the present invention is to provide a simplified fluid level gauge for estimating the fluid level within a reservoir bottle.

Another object is to provide a fluid level gauge mechanism for estimating the fluid remaining in both bottles which collapse when fluid is discharged and bottles which do not collapse.

Another aspect of the present invention provides an arrangement useful for determining levels of fluids in bottles or other containers within dispensers whether the bottles or containers be collapsible or substantially not collapsible or rigid.

In the context of a rigid bottle, the preferred invention utilizes a path for the radiation which extends through the fluid within the bottle such that differences in radiation sensed will vary depending upon the extent that the path for the radiation is either through the fluid in the bottle or through gas or air in the bottle above the fluid. The radiation path may merely pass merely once directly through the bottle without being reflected or may be a reflected path in which radiation is reflected and redirected preferably being reflected back through the bottle. In the context of a collapsible bottle, the radiation path is preferably selected such that the path intersects with portions of the bottle in some conditions and, in other conditions, the path does not intersect with portions of the bottle. The radiation path for a collapsible bottle may also be a path which requires the radiation to pass through fluid in the bottle. In the context of a collapsible bottle, either the reflection of radiation or a reduced transmission of radiation can be used to sense the presence of a portion of a bottle in a radiation path as contrasted with less or no radiation being sensed being indicative of an absence of a portion of a bottle in the radiation path. A radiation path can be selected such that reflection of radiation from the interior or exterior of a wall of a bottle can be used as an indication of an alteration of the shape of a collapsible bottle.

In accordance with a first aspect of the present invention, the present invention provides a dispenser comprising:
a housing,
a collapsible bottle containing fluid to be dispensed,
a pump mechanism to dispense liquid from the bottle,
the bottle having a first end and a second end, the bottle having an outlet opening at the first end, the bottle closed other than for the outlet opening at the first end,
on dispensing of liquid through the outlet opening by the pump mechanism, a vacuum is created in the bottle and the bottle collapses as a volume of the bottle decreases and the liquid in the bottle is dispensed,
the bottle having a length from the first end to the second end which reduces as the volume of the bottle decreases,
in a full condition when filled with the liquid, the volume of the bottle is a first volume and the length of the bottle is a first length,
in a near empty condition, the volume is a second volume less than the first volume and the length is a second length less than the first length,
the housing carrying a gauging mechanism to estimate the volume of fluid in the bottle,
the fluid level gauging mechanism comprising:
an emitter of electromagnetic radiation within a range of wavelengths, and a sensor of electromagnetic radiation within the range of wavelengths,
the emitter carried on the housing to emit the radiation towards the bottle;
the sensor carried on the housing to receive the radiation from the emitter which is reflected from the bottle,
wherein the emitter directs radiation in a direction such that:
(a) when the bottle is coupled to the housing and the bottle has a length greater than the second length, the radiation emitted by the emitter engages and reflects off a portion of the bottle proximate the second end of the bottle, and (b) when the bottle has a length equal to or less than the second length, the radiation emitted by the emitter does not engage the bottle.

In accordance with a second aspect of the present invention, a fluid level gauging mechanism for estimating fluid levels in a bottle and which mechanism includes a controller, controlling operation so as to periodically and successively perform:

(i) a step of emitting radiation with an emitter and simultaneously sensing the relative level of radiation received by a sensor to determine a sensed radiation value, (ii) comparing the sensed radiation value in one step (i) to a compared value selected from a pre-selected value and sensed values sensed in another steps (i), and (iii) identifying when a significant change in the sensed radiation values occurs, and characterizing the significant change in the sensed radiation values as an indication of the level of fluid in the bottle.

In accordance with a third aspect of the present invention, the present invention provides a dispenser comprising:

a housing, a bottle containing fluid to be dispensed, a pump mechanism to dispense fluid from the bottle, the bottle removably coupled to the housing for replacement, the bottle having a wall defining a cavity therein within which fluid is contained, the wall having an exterior surface and an interior surface, the interior surface facing the cavity, the housing carrying a fluid level gauging mechanism to estimate the level of fluid in the bottle, the fluid level gauging mechanism comprising:

an emitter of electromagnetic radiation within a range of wavelengths, and a sensor of electromagnetic radiation within the range of wavelengths, the wall of the bottle including window portions permitting electromagnetic radiation within the range of wavelengths to pass through the wall, the window portions including an inlet window and an outlet window, wherein when the bottle is coupled to the housing:

the emitter is located outside the bottle exterior of the exterior wall positioned to direct the electromagnetic radiation into the bottle through the inlet window, and the sensor is located outside the bottle exterior of the exterior wall to receive electromagnetic radiation from emitter which is reflected within the bottle to pass outwardly through the outlet window, wherein in operation the emitter directs radiation into the bottle through the inlet window and the sensor receives radiation from the emitter reflected from within the bottle out through the outlet window. Preferably, the emitter is carried on the housing at an emitter vertical height, and the sensor is carried on the housing at a sensor vertical height different than the emitter vertical height. The inlet window is located relative the housing at an inlet vertical height and an outlet window is located relative the housing at an outlet vertical height different than the inlet vertical height. Preferably, the wall having sides which extend from a first end to a second end, the sides comprising a rear side, a front side, a right side and a left side, the wall having a right rear corner joining the rear side to the right side and a left rear corner joining the rear side to the left side, and a first of the right rear corner and the left rear corner comprising the inlet window and a second of the right rear corner and the left rear corner comprising the outlet window.

Preferably, the electromagnetic radiation is infrared radiation, the bottle has a wall of plastic material translucent to the electromagnetic radiation. Preferably, the bottle carries a label on a wall of the bottle which assists in reflecting radiation emitted into the bottle towards a position where the radiation is to be sensed.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
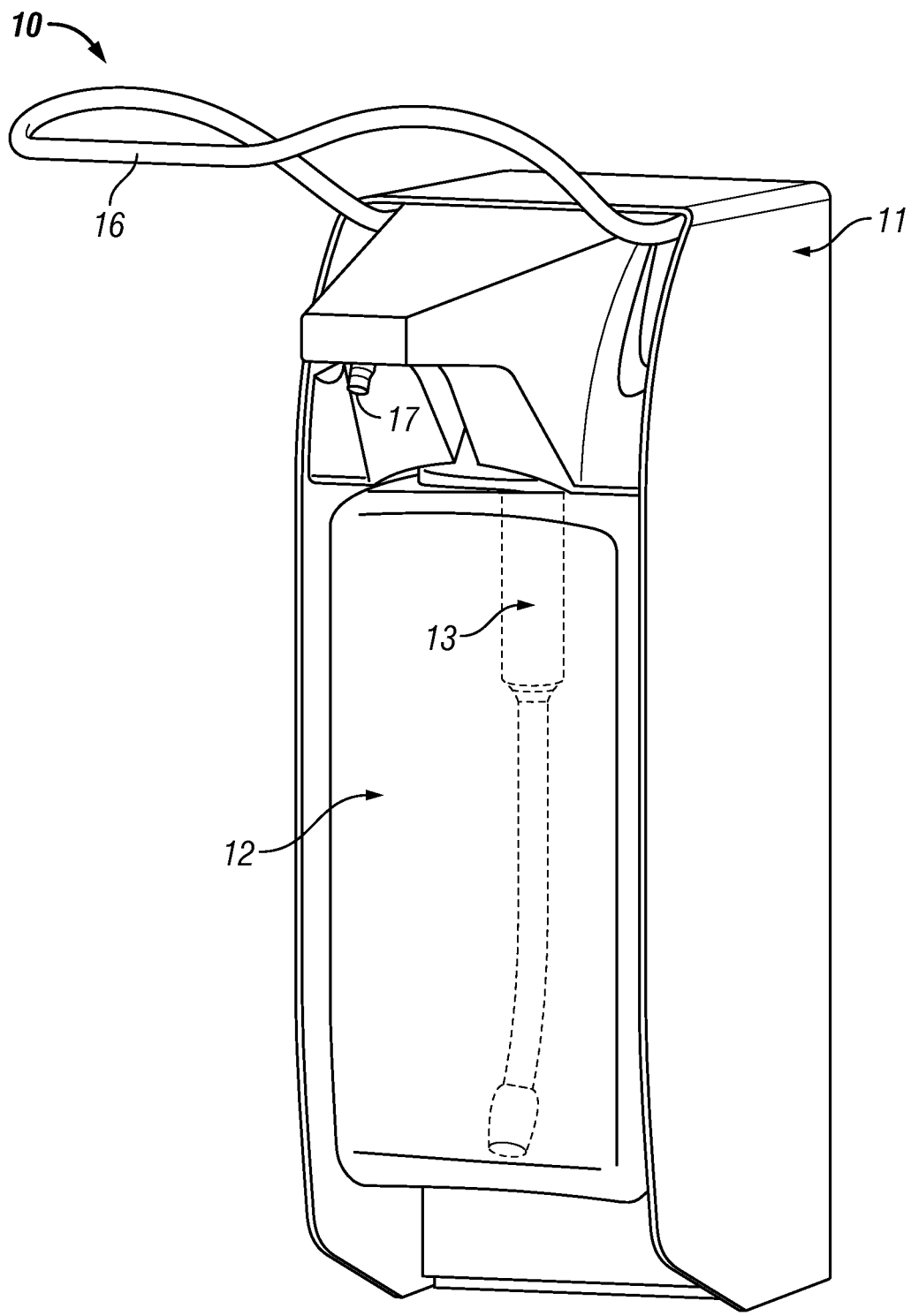
FIG. 1 shows a fluid dispenser in accordance with a first embodiment of the invention.
Figure 2:
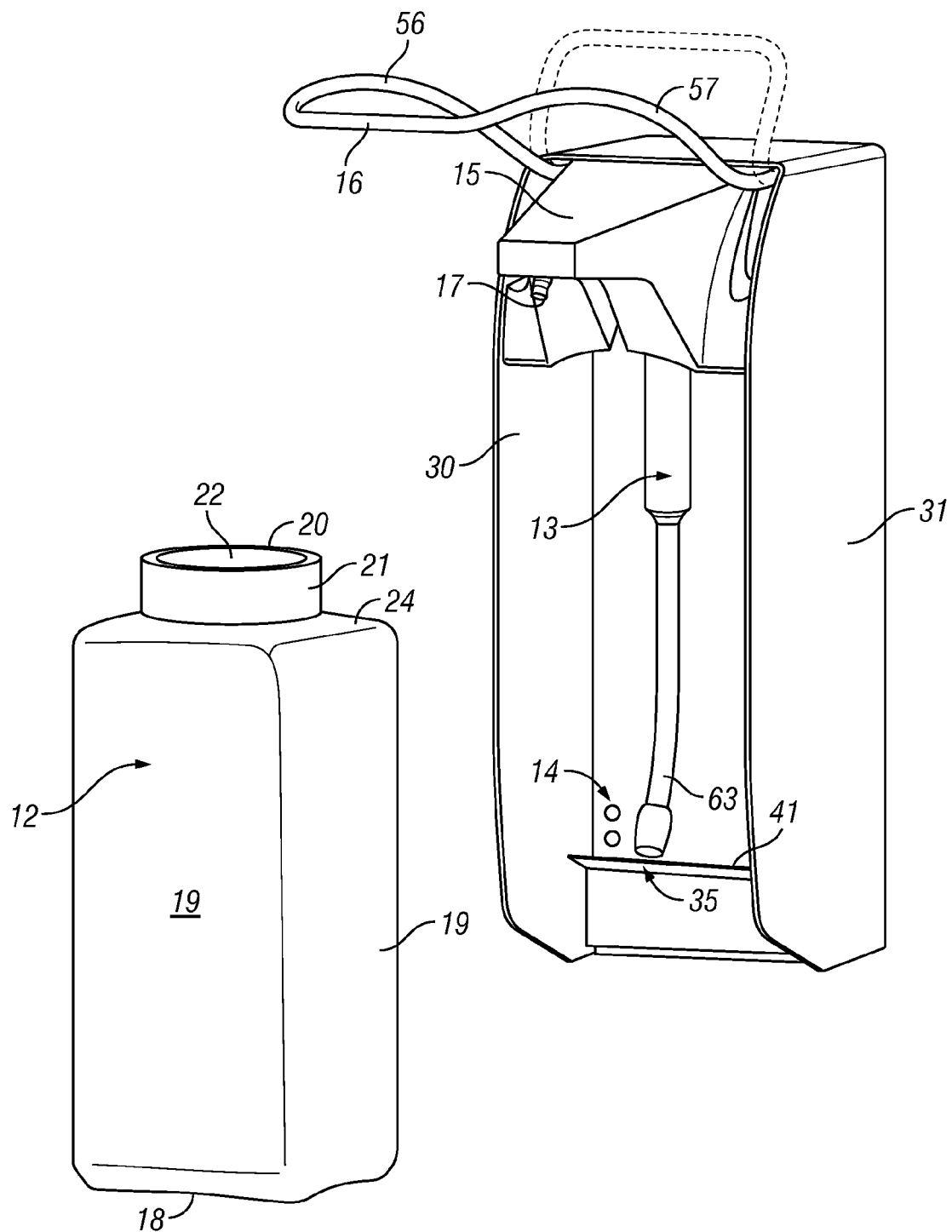
FIG. 2 is an exploded view of the dispenser of FIG. 1 showing the housing, the pump mechanism and the bottle.

FIGS. 1 and 2 show a fluid dispenser 10 in accordance with the present invention having a housing 11, a removable bottle 12, and a pump mechanism 13, with a fluid level sensing mechanism 14 only seen in FIG. 2. The housing 11 carries a removable shroud 15. The pump mechanism 13 is activated by an activation lever 16.

Figure 3:
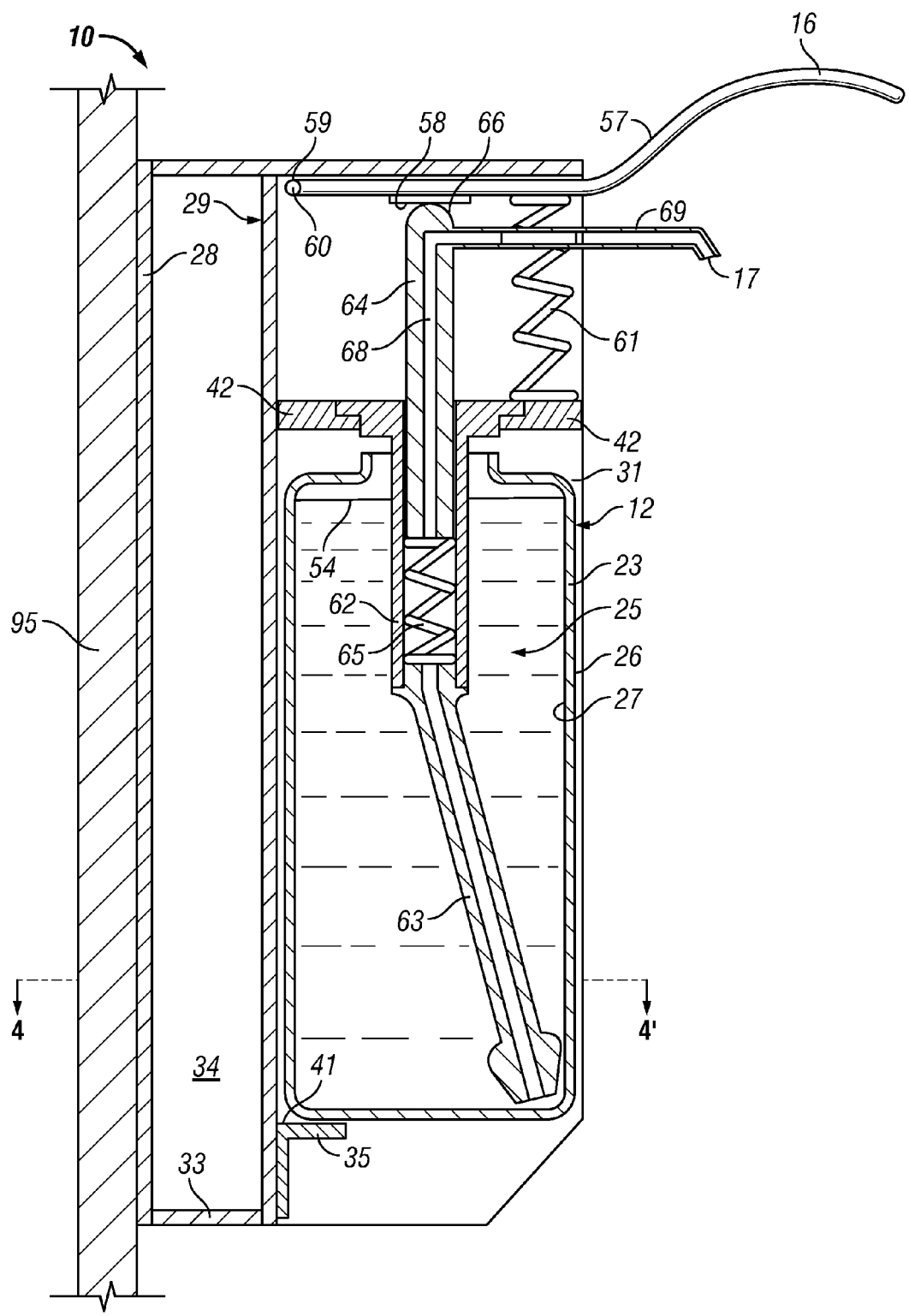
FIG. 3 is a schematic cross-sectional side view of the dispenser of FIG. 1.

The dispensing unit 10 is shown in FIG. 3 as mounted to a wall 95.

The dispenser 10 is adapted to be manually activated by a user urging the activation lever 16 downwardly so as to dispense fluid from a discharge outlet 17 onto a hand of a user disposed underneath.

The bottle 12 is closed at its bottom or lower end 18. Sides 19 of the bottle 12 extend upwardly from the lower end 18 to an upper end 20 having top or shoulder 24 merging into an upstanding neck 21 carrying an opening 22. The sides 19 are characterized as a front side 53, rear side 52, right side and left side. The bottle 12 has a thin wall 23 which forms the lower end 18, sides 19, shoulder 24 and the neck 21. The wall 23 defines a cavity 25 within the bottle 12 within which fluid to be dispensed is contained. As seen in FIG. 3, the wall 23 has an outwardly directed exterior surface 26 and an interior surface 27 which faces inwardly into the cavity 25.

The housing 11 has a rearmost vertical wall plate 28 and a vertical back plate 29. The wall plate 28 is adapted to be secured to the wall 95. Side plates 30 and 31 extend along each side of the wall plate 28 and the back plate 29 forwardly in parallel vertical planes. A horizontal top plate 32 extends forwardly on top of the wall plate 28 and the back plate 29 forwardly between the side plates 30 and 31. A horizontal bottom plate 33 extends forwardly below the wall plate 28 and the back plate 29. A compartment 34 is defined rearward of the back plate 29 between the wall plate 28 and the back plate 29, between the side plates 30 and 31 and between the top plate 32 and the bottom plate 33. A horizontal bottle support bracket 35 is provided extending along the back plate 29 bridging between side plates 30 and 31 and presenting an upwardly directed support surface 41 to engage and support the bottle 12. The housing 11 also has a pump support plate 42 which extends forwardly from the back plate 29 between the side plates 30 and 31 to support the pump mechanism 13.

Figure 4:
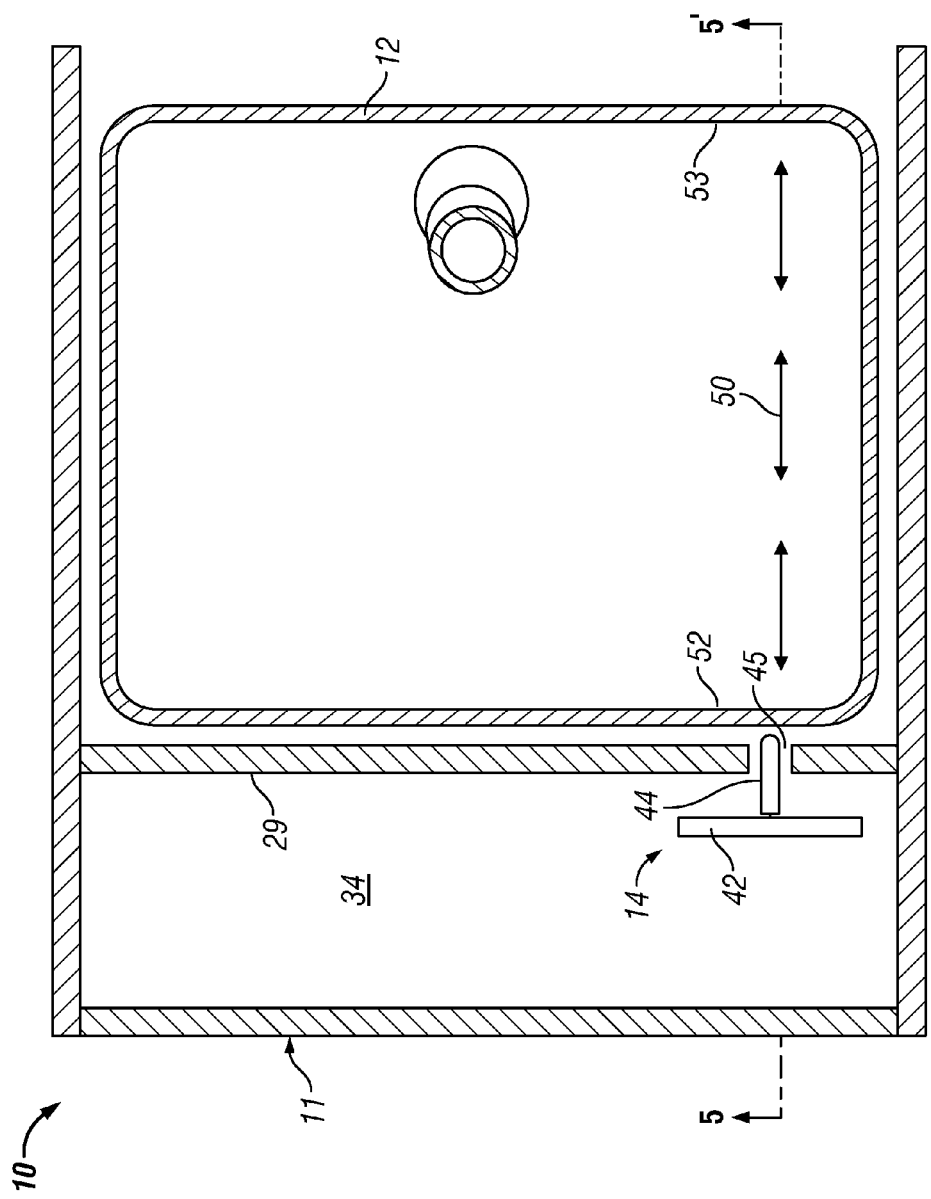
FIG. 4 is a cross-sectional top view of FIG. 3 along section line 4-4' in FIG. 3 schematically showing merely the bottle and the fluid level gauge mechanism.
Figure 5:
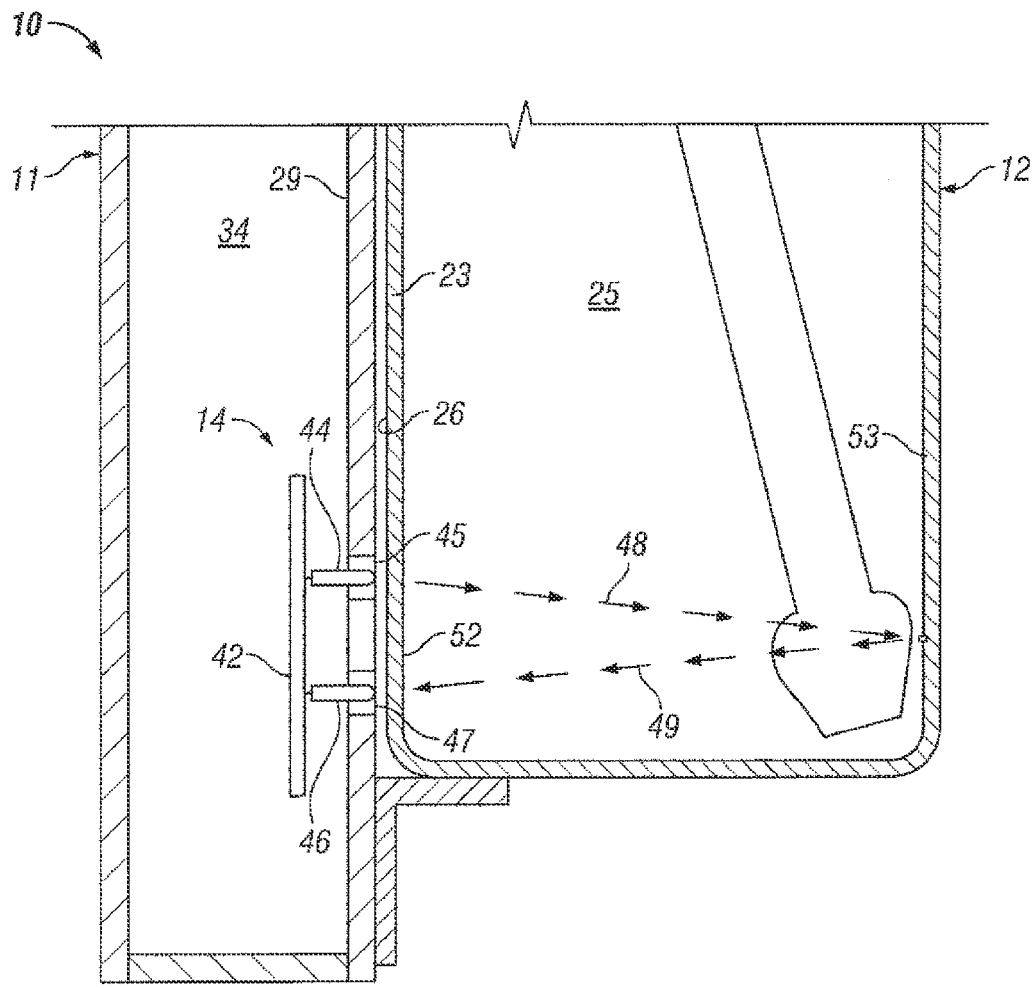
FIG. 5 is a schematic cross-sectional side view along section line 5-5' in FIG. 4 view showing the fluid level gauge mechanism.

As seen in FIGS. 4 and 5, the fluid level gauging mechanism 14 is schematically illustrated as comprising a rectangular circuit board 42 carrying an infrared emitter 44 and an infrared sensor 46. The circuit board 42 is carried by the housing 11 within the compartment 34 rearward of the back plate 29. Two vertically spaced openings 45 and 47 are provided through the back plate 29. The emitter 44 is located to extend through the upper opening 45 and the sensor 46 is located to extend through the other, lower opening 47, such that each of the emitter 44 and the sensor 46 is disposed rearward of the exterior surface 26 of the wall 23 of the rear side of the bottle 12. The wall 23 of the rear side of the bottle 12 in front of each of the emitter 44 and the sensor 46 permits IR radiation within the range of wavelengths emitted by the IR emitter 44 and sensed by the IR sensor 46 to pass through the wall 23.

Each of the emitter 44 and sensor 46 is located outside the bottle 12, exterior of the exterior surface 27 of the wall 23 of the rear side of the bottle 12. The emitter 44 is positioned to direct IR radiation into the cavity 25 within the bottle 12 and the sensor 46 is located to receive IR radiation from the emitter 44 which is reflected from within the cavity 25 within the bottle and passes outwardly from the cavity 25 through the wall 23 of the rear side of the bottle. In operation, the emitter 44 directs radiation into the bottle 12 through the wall 23 of the rear side and the sensor 46 receives radiation from the emitter 44 which is reflected within the bottle 12 and passes from the cavity 25 out of the cavity through the wall 23 of the rear side of the bottle.

As shown in side view in FIG. 5, the emitter 44 is at a vertical height above the sensor 46. IR radiation from the emitter 44 is shown to extend along a path indicated by arrows 48 to travel through the wall 23 of the rear side 52 of the bottle into the cavity 25 to traverse the cavity 25 to engage the wall 23 of the front side 53 of the bottle 12 on a diametrically opposite the rear side of the bottle 12 and to be reflected on a path shown by the arrows 49 to traverse the cavity 25 and travel through the wall 23 of the rear side out of the cavity 25 to be sensed by the sensor 46. In top view as seen in FIG. 4, the path of the radiation shown by the arrows 48 and 49 in FIG. 5 are shown by the double headed arrows 50.

In FIGS. 3 and 6 to 8, the level of fluid in the bottle is indicated as 54. With activation of the pump mechanism 13, the fluid level 54 in the bottle 12 will decrease as from a relatively full condition as shown in FIG. 3 successively to the conditions shown in FIG. 6, FIG. 7 and FIG. 8 with the fluid level 54 progressing from heights above the emitter 44, to the same height as the emitter 44, to below the emitter 44 and above the sensor 46, to the same height as the sensor 46 and then to below the sensor 46.

Figure 9:
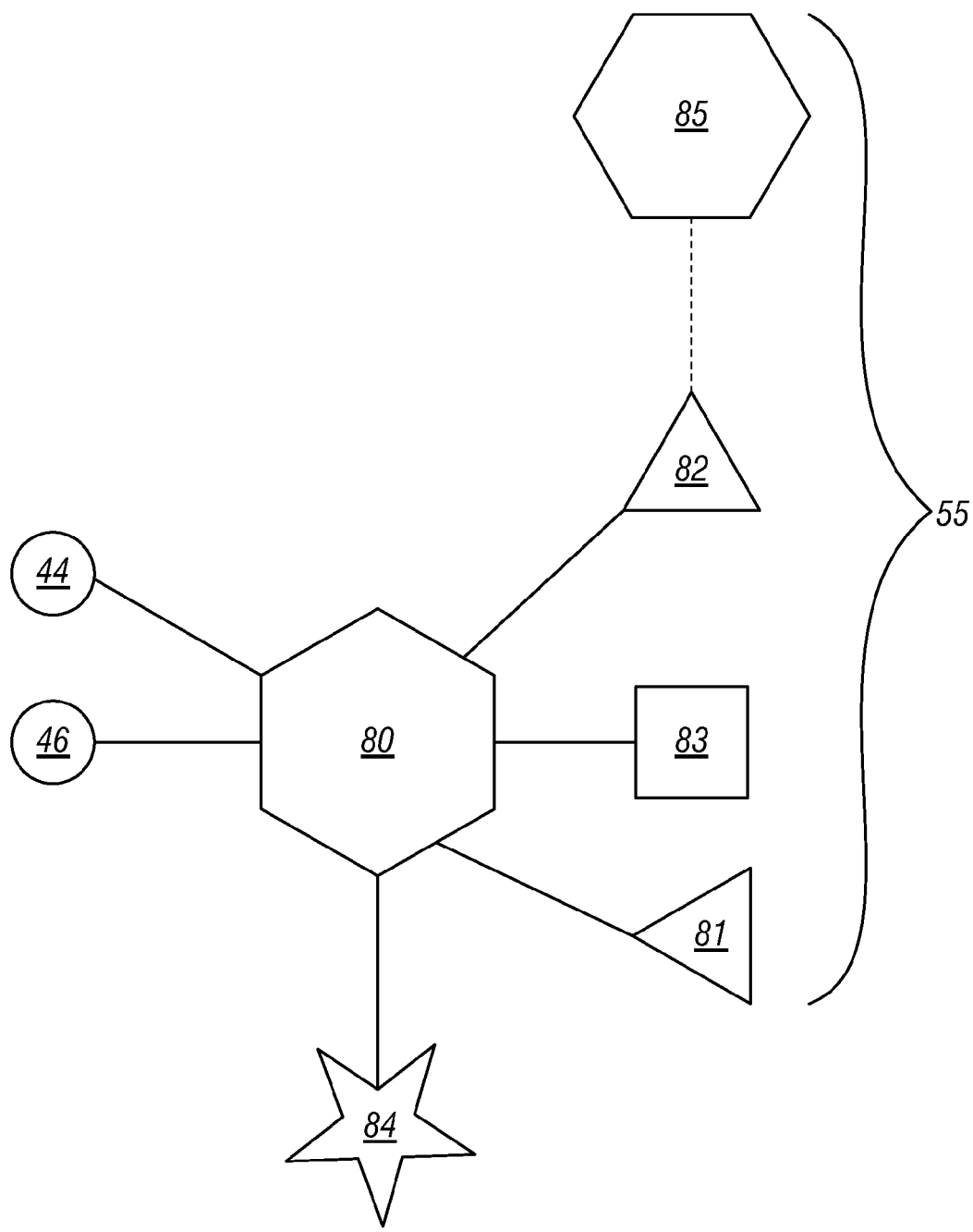
FIG. 9 is a schematic diagram of a control mechanism for the dispenser of FIG. 1.

As seen in FIG. 9, the fluid level gauging mechanism 14 includes a control mechanism 55 to control the operation of the emitter 44 and the sensor 46. The control mechanism 55 operates the emitter 44 to emit electromagnetic radiation within a specific range of wavelengths and simultaneously operates the sensor 46 to sense electromagnetic radiation representative of the radiation emitted, preferably within the same specific range of wavelengths as the radiation emitted by the emitter 44. Preferably, the electromagnetic radiation emitted is infrared radiation and the sensor 46 senses infrared radiation of the same wavelength as emitted. Preferably, the radiation is emitted by the emitter 44 periodically for short intervals as individual bursts so as to minimize power consumption. The radiation sensed by the sensor 46 as in any burst may be compared to the radiation emitted so as to determine a relative extent to which the radiation emitted by the emitter 44 is received by the sensor 46. The relative radiation sensed by the sensor 46 for any burst is compared to either a pre-established threshold radiation or to the relative radiation sensed by the sensor 46 in other bursts.

FIG. 9 schematically illustrates the control mechanism 55 as including a controller 80 which interfaces with the emitter 44 and the sensor 46, as well as a power source 81, a communication module 82 and a data storage module 83. The control mechanism 55 is also shown as including an optional status indicator 84, and an optional remote computer 85.

Figure 10:
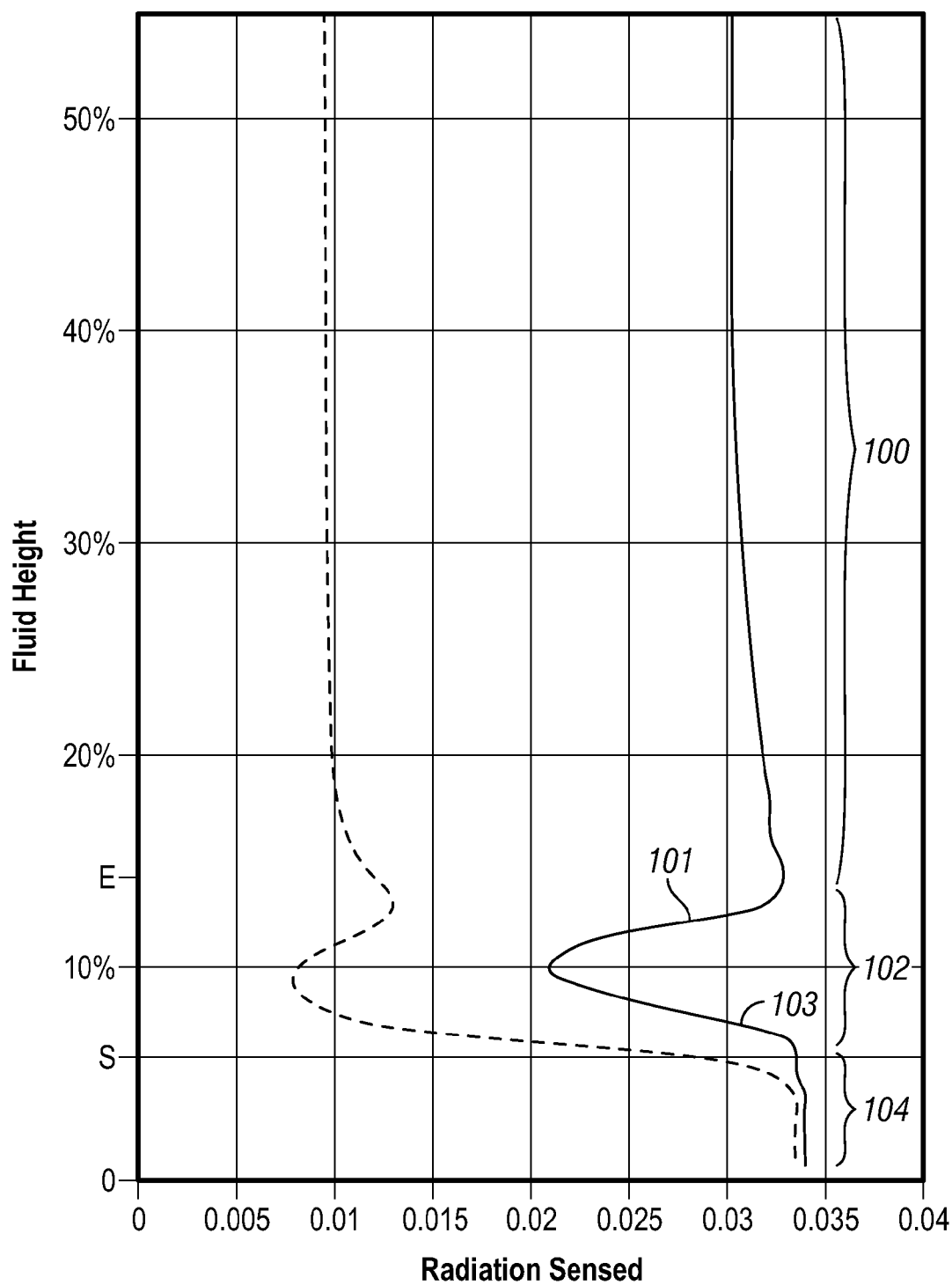
FIG. 10 is a chart plotting the fluid height in a bottle versus the reflected radiation sensed.

Reference is made to FIG. 10 which is a graph illustrating the fluid height of the fluid level 54 in the bottle versus the relative level of radiation sensed by the sensor 46 when a constant level of radiation is emitted by the emitter in each successive burst of radiation. The fluid height is indicated as a percentage of the height of fluid in a full bottle. The relative vertical height of the emitter 44 is indicated as E and the relative vertical height of the sensor 46 is indicated as S. In the preferred first embodiment, a mid-point between the emitter vertical height E and the sensor vertical height S is a fluid height corresponding to about 10 percent of the height of fluid in the bottle. With a bottle assumed to have a constant cross-sectional shape throughout its height, this 10 percent height of fluid in the bottle represents a fluid level corresponding to about 10 percent of the volume of the bottle.

FIG. 10 shows in a solid line the radiation sensed by the sensor 46 when the bottle is filled with a first fluid comprising as an alcohol based hand cleaner, an aqueous solution of alcohol comprising about 60 percent alcohol and 40 percent water. FIG. 10 shows in a dashed line the radiation sensed by the sensor 46 when the bottle is filled with a second fluid comprising a typical soap based cleaner comprising an aqueous solution of water and soap having a composition which is less transmissive of IR radiation than the aqueous solution of alcohol of the first fluid.

Figure 6:
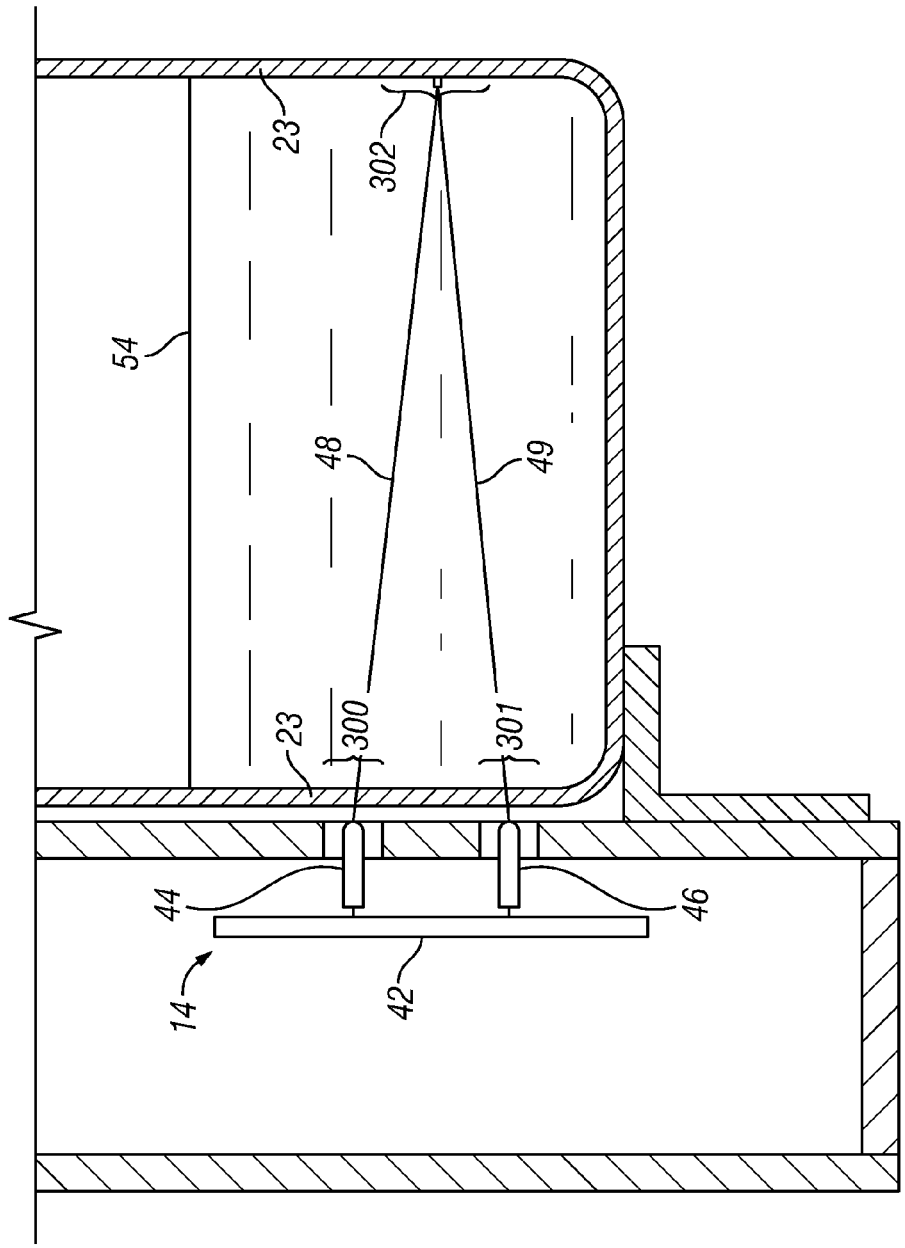
FIGS. 6, 7 and 8 each is a schematic cross-sectional side view similar to FIG. 5 and showing respectively conditions in which the level of fluid in the bottle is, respectively, above both the IR emitter and sensor, intermediate the IR emitter and sensor, and below the IR emitter and sensor.
Figure 7:
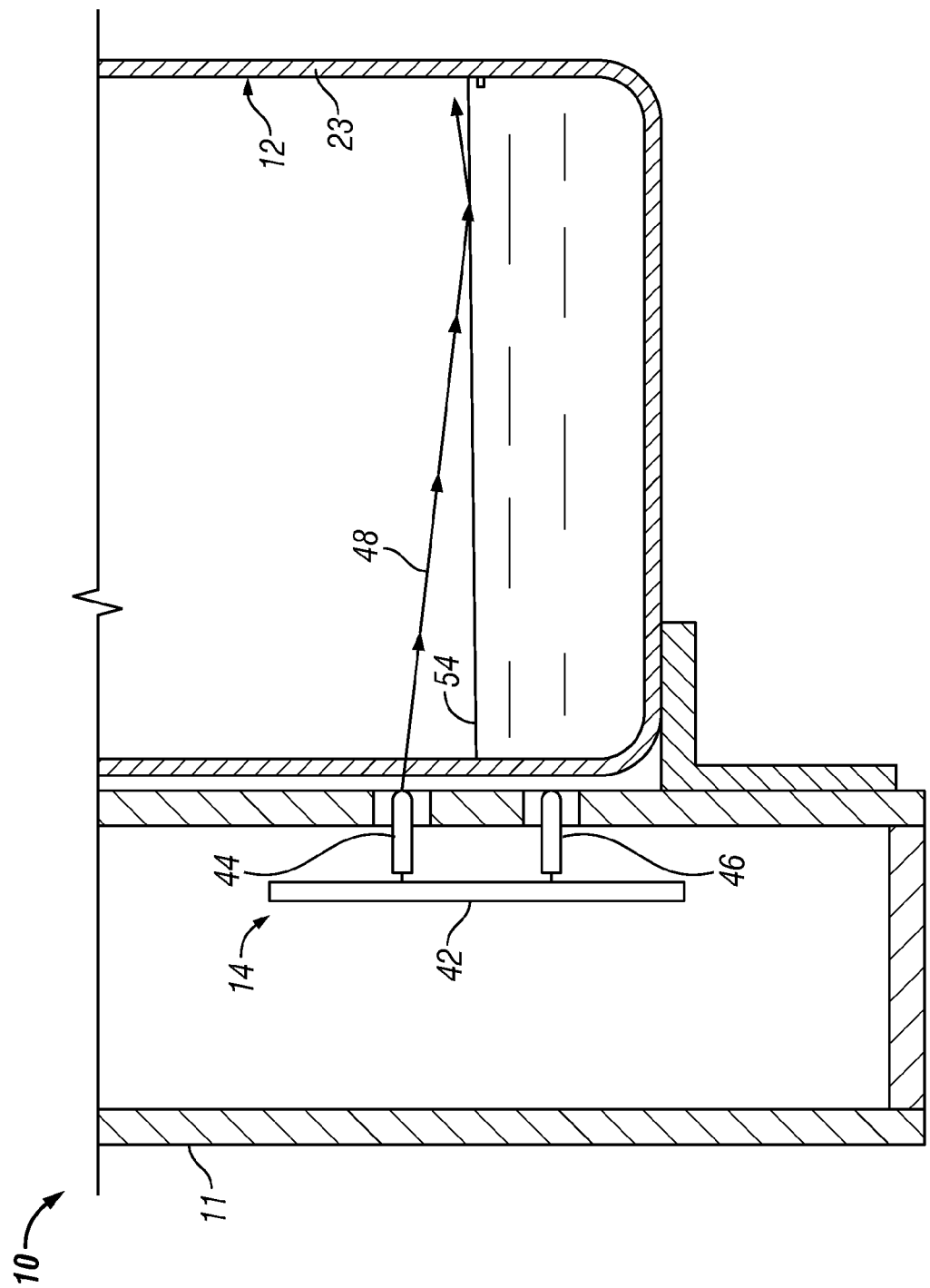
Figure 8:
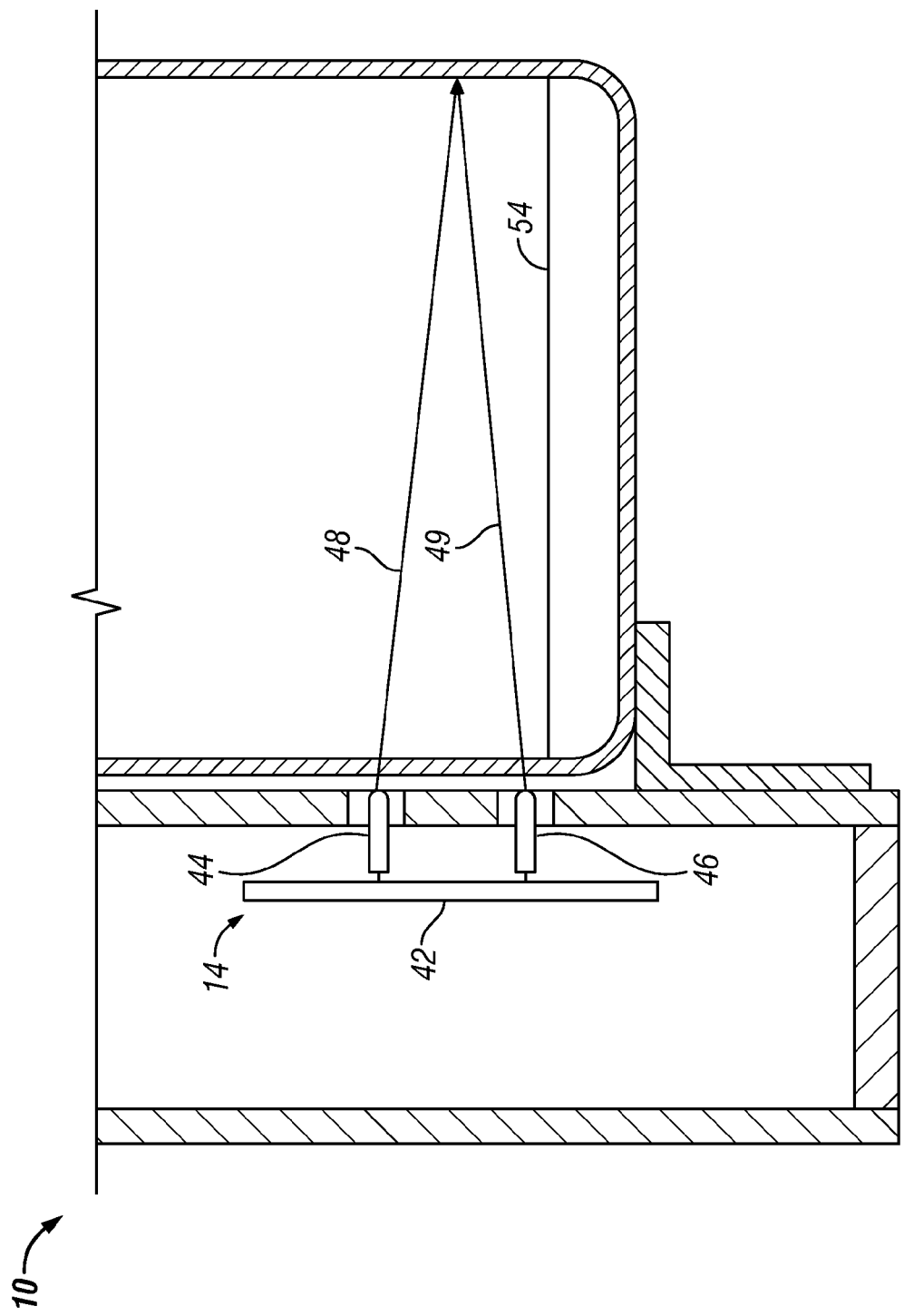

In each fluid, the infrared radiation used is in the range of X to Y. With such radiation, the alcohol based cleaner transmits the radiation to a greater extent than the soap based cleaner. As is to be appreciated, the level of reflection is substantially constant for each liquid as the fluid level 54 decreases downwardly from being substantially full to a point where the fluid level is above the emitter vertical height E in a condition as indicated in FIG. 6. As is expected, when the fluid level 54 is intermediate the emitter vertical height E and the sensor vertical height S in a condition indicated in FIG. 7, the sensed radiation is at a minimum. When the fluid level 54 is below the sensor vertical height S, the sensed radiation rises to a maximum representing the radiation that is reflected back after passage through air in the bottle in a condition as indicated in FIG. 8. In the case of the soap based cleaner, the relative level of sensed radiation when the level is below the sensor vertical height S is substantially greater than the relative level of radiation emitted when the fluid height 54 is above the emitter vertical height E. In contrast, the alcohol based cleaner transmits the radiation to a greater degree and thus the reflected radiation of the alcohol based cleaner when the fluid level 54 is below the sensor vertical height S is much closer to the sensed radiation when the fluid height 54 is above the emitter vertical height E.

As seen in FIG. 10, the IR response represented by the radiation sensed is indicated as having three portions, an above portion 100 over which the radiation sensed is substantially constant at approximately a first level, a below portion 104 over which the radiation is substantially constant at a relatively high level and an intermediate portion 102 over which the radiation sensed changes rapidly. The intermediate portion includes a decreasing segment 101 and an increasing segment 103.

The control mechanism 55 will take readings of the radiation sensed over time and by a comparison of the radiation sensed over time make a determination as to where the fluid level is. It will be appreciated to a person skilled in the art that this can be accomplished in a number of ways. For example, from a number of data points from the above portion 100, on obtaining readings which deviate significantly from the above portion readings, and are less than the above portion readings, then an estimate can be made that the fluid level is in the intermediate portion 102. Alternatively, the relative change of the sensed radiation level with time can be used so as to determine the relative change between readings over the above portion 100 as contrasted with the relative change in the intermediate portion 102 and identify the intermediate portion 102 by reason of a greater change per time or activation.

Various algorithms may be established depending upon the number of readings which are to be taken and the extent to which data of the readings may be maintained and stored and be accessible over time.

The radiation sensed can also be useful for determining a condition that no bottle is present as, for example, by providing a consistent reading in which there is no substantially no reflected radiation received. The reflected radiation would not be received, for example, if no bottle was present and the dispenser did not have a front cover to its housing. Adjustments can be made to avoid false readings due to ambient radiation.

Figure 11:
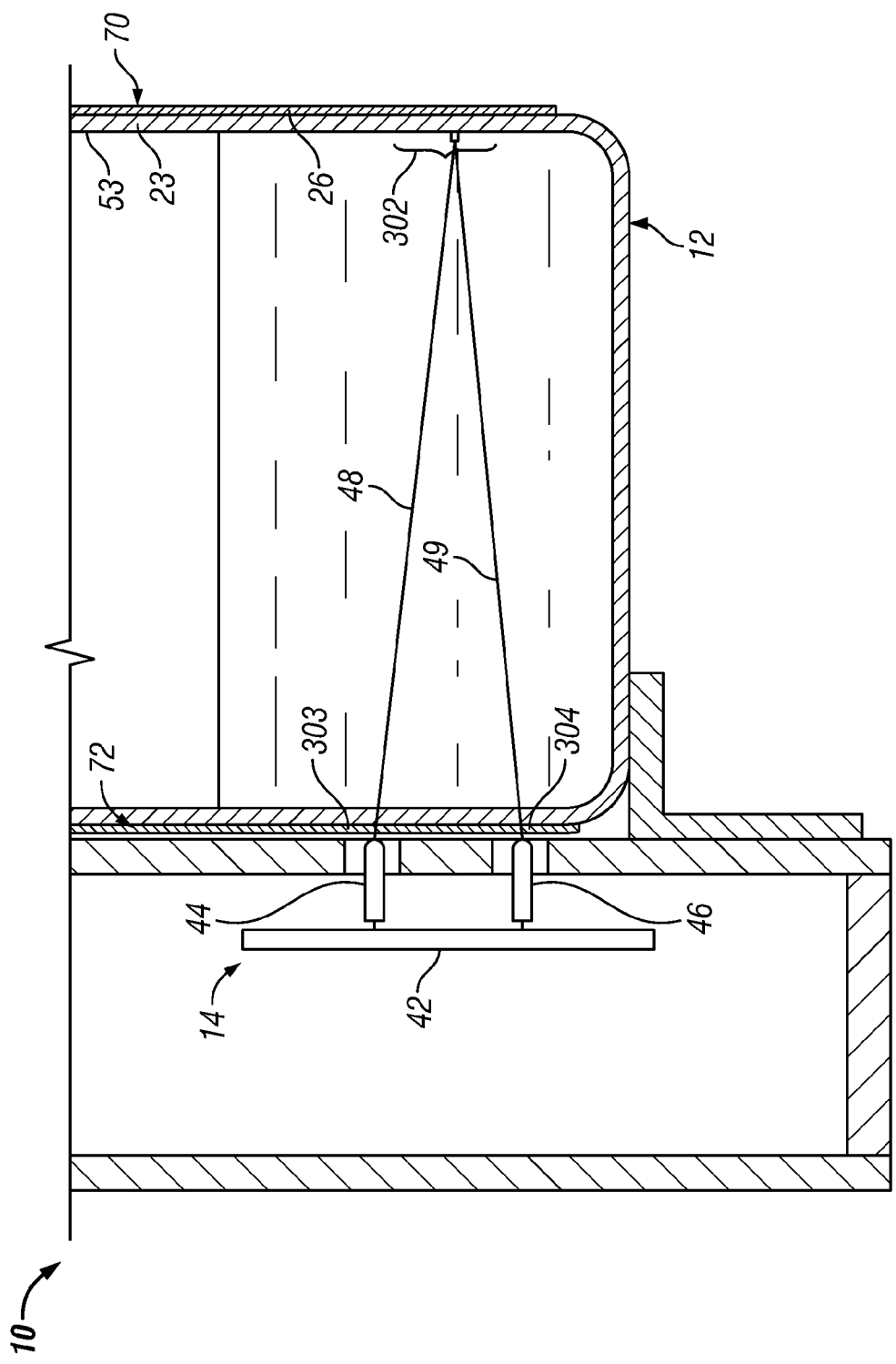
FIG. 11 is a schematic cross-sectional view similar to FIG. 6 but showing a second embodiment of a dispenser in accordance with the present invention.

The system can be used to determine if a bottle which is not intended for use with the dispenser has been inserted into the dispenser, For example, as seen in FIG. 11, a bottle for use with the invention may be provided with customized labels such as a customized rear label 72 with an inlet window 303 and an outlet window 304 located, respectively, relative to the emitter 44 and the sensor 46. Products which may have labels which cover where inlet window 303 and outlet window 304 are to be provided would not have radiation sensed by the sensor 46 and thus provide an indication that an erroneous bottle may have been inserted. As will be appreciated, by the relative location of the emitter and sensor at different heights and different locations and corresponding labels 72 being provided with appropriate inlet windows 303 and outlet windows 304, a system for keying of specifically labelled bottles to specific dispensers may be adopted so as to signal use of a bottle other than a bottle as intended in any particular dispenser.

As seen in FIG. 9, the control mechanism 55 optionally includes a remote computer 85. Under this configuration, the components comprising the control mechanism 55 that are provided within the dispenser may make data readings and transmit data to the remote computer 85 with the remote computer 85, for example, to perform calculations. In a preferred embodiment, communication is from the communication module 82 merely one way to the computer with the remote computer 85 to perform calculations to determine when the dispenser may be substantially empty and thus via the computer system send a message as to a worker that the bottle for the fluid dispenser is close to empty and should be replaced or refilled. However, the communication may be two way as to provide communication from the computer 85 back to the controller 80 in the dispenser 10 as, for example, to activate a warning light 85 on the dispenser that the dispenser is close to empty.

The control mechanism 55 is indicated as having a data storage module 83 which can store varying amounts of data depending upon the nature of the operation of the dispenser. Insofar as information for data reading is to be sent to a remote computer, then the size and capability of the data storage module 83 may be minimal. Insofar as the control mechanism 55 as contained within the dispenser 10 may itself desire to make calculations, then the size of the data storage module 83 and its capability may need to be increased.

As to the nature of the power supply 81, the dispenser 10 may be a manually operated dispenser or may be an automated dispenser with a power source driving the pump to dispense fluid as, for example, when activated by a switch which may comprise a manually operated switch or, more preferably, a touchless arrangement in which the proximity of a person's hand to the dispenser operates a dispenser. In an automated dispenser which is preferably touchless, the power source may comprise a battery or other power source as, for example, 12 volt or 115 volt with the dispenser hardwired to the power source. With a manually operated dispenser, the control mechanism 55 may be powered preferably by batteries which batteries or another power storage device may in a preferred embodiment may be recharged as, for example, by a solar battery charger or by a generator which provides power on manual movement of the activation lever 16. In a preferred embodiment of the present invention, the dispenser is manually operated with those portions of the control mechanism 55 within the dispenser operating with minimum power consumption for transmission of data from the communication module 82 to a remote computer system.

As to the nature of the fluid within the bottle, there is no particular limit, however, the fluid for the first embodiment needs to be selected to be a fluid which will permit selected electromagnetic radiation to pass therethrough and be reflected by the front of the bottle back to the sensor 46. It is within the scope of persons skilled within the art to select a suitable wavelength of electromagnetic radiation and the particular fluid for use in the bottle. Preferred electromagnetic radiation includes infrared radiation preferably with wavelengths in the range of X to Y. These wavelengths are useful for transmission through many commercially available alcohol based hand cleaners and soap based hand cleaners.

As to the nature of the material from which the bottle 12 and its wall 23 is formed, preferred materials include glass and plastic materials with preferred plastic including polyethylene plastics. It is within the knowledge of a person skilled in the art to make a suitable selection as to the nature of the material for the wall of the bottle so as to permit suitable transmission of the selected radiation therethrough.

The wall 23 of the bottle 12 may have the same composition and thickness throughout the entirety of the bottle or may have selective composition and thickness over window portions and the reflecting portion.

On FIG. 6, window portions of the wall 23 of the rear side of the bottle 12 in front of the emitter 44 and the sensor 46 which are indicated as 300 and 301, respectively, are the only portions of the wall 23 which need to have an ability to permit radiation to pass therethrough. Similarly, a reflective portion 302 on the wall 23 of the front side of the bottle 12 is the only portion that needs to be at least partially reflective. The nature of the wall 23 may be such that over the window portions 300 and 301 merely a portion of the radiation passes through and some is reflected. The wall 23 may have the same composition and thickness throughout the entirety of the bottle or may have selective composition, thickness and/or reflective properties over the window portions 300 and 301 and the reflecting portion 302.

The ability of the wall 23 to transmit and/or reflect radiation can be modified over the window portions 300 and 301 and reflective portion 302 a number of ways.

As seen in an embodiment of a bottle 12 shown in FIG. 11, a front label 70 is applied to the exterior surface of the wall 23 of the front side of the bottle 12. This label 70 covers the exterior surface 26 of the wall 23 over a reflection portion 302 where IR radiation from the emitter 44 engages the wall 23 along path 48 and is reflected back to the sensor 46 along path 49. The front label 70 is optional, however, the front label 70 may preferably be provided to increase the extent to which IR radiation from the emitter 44 is reflected from the front side 53 of the bottle. The front label 70, for example, may have a reflective rear surface, for example, of an aluminum foil.

The emitter 44 is carried on the housing 11 at a height referred to as an emitter vertical height E and the sensor 46 is carried on the housing 11 at a height referred to as the sensor vertical height S. The sensor vertical height S in some preferred embodiments is different than the emitter vertical height E. For example, in the preferred first and second embodiments, the emitter 44 is above the sensor 46, that is, with the emitter vertical height E greater than the sensor vertical heights. However, the sensor 46 may be above the emitter 44.

A rear label 72 is shown in FIG. 11 applied to the exterior surface of the wall 23 of the rear side of the bottle 12. The rear label 72 has openings therethrough in front of each of the emitter 44 and sensor 46, respectively, which openings are an inlet opening 303 in front of the emitter 44 and an outlet opening 304 in front of the sensor 46.

Figure 12:
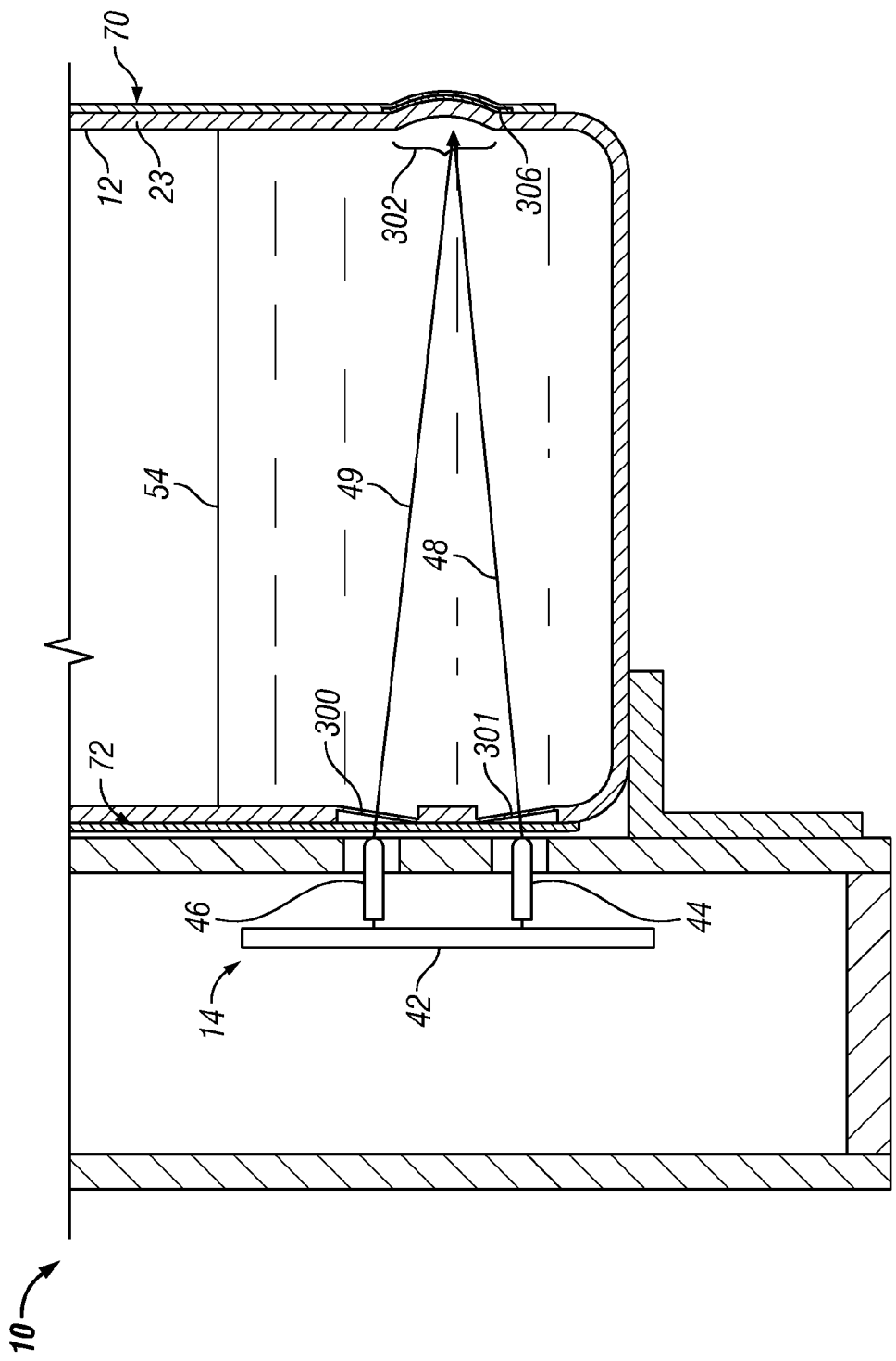
FIG. 12 is a schematic cross-sectional view similar to FIG. 6 but showing a third embodiment of a dispenser in accordance with the present invention.

The bottle may be chosen to have suitable physical arrangements so as to enhance, on one hand, transmission of light therethrough on the rear side and reflection on the front side 53. For example, to enhance transmission, over the area of the inlet window 300, the wall 23 on the rear side may be disposed to be perpendicular to radiation emitted from the emitter 44 and similarly over the outlet window 301 the wall 23 on the rear side may be disposed to be perpendicular to light reflected from the front side. Towards increasing reflection or focussed reflection, the reflective portion 302 of the wall 23 on the front side may have a shape to optimize reflection as, for example, by having a convex surface which acts as a lens to direct light engaged thereon towards the sensor 46 at least over an area which is intermediate the emitter height E and the sensor height S. In this regard, reference is made to FIG. 12 which illustrates a third embodiment in a side view similar to that shown in FIG. 6, however, in which each of the sensor 46 and the emitter 44 have been disposed so as to direct radiation parallel their respective lines 48 and 49. Each of the inlet window 300 in front of the emitter 44 and the outlet window 301 in front of the sensor 46 is shown to comprise a relatively thin portion of the wall 23. The inlet window 300 has its exterior surface 26 and interior surface 27 each disposed to be perpendicular to the path 48. The outlet window 301 is shown to have its exterior surface 26 and interior surface 27 perpendicular to the path 49. The reflected portion 302 is shown to have both an interior surface 27 and an exterior surface 26 which are curved so as from the inside each provides a concave surface. A front label 70 is shown applied which includes a reflective section 306 with a mirrored interior surface to assist in reflecting radiation over merely the reflective portion 302. This third embodiment also illustrates an arrangement in which the sensor 46 is disposed at a height above the emitter 44.

The activation lever 16 comprises a continuous length of metal rod having two Z-shaped side arm portions 56 and 57 joined by a centre bridging bar 58. Each of the side portions 56 and 57 are pivotally coupled at their rear end 59 to the respective side plates 30 and 31 for pivoting about the same horizontal axis 60. A spring member 61 is disposed between support plate 42 and the actuation lever 16 so as to bias the actuation lever 16 to pivot about the axis 60 counter-clockwise as seen in FIG. 3.

FIG. 3 illustrates an extended position in which the spring 61 has biased the actuation lever 16 as far counter-clockwise as possible. From the extended position of FIG. 3, a user may engage the bridge portion 58 of the activation lever 16 and move the activation lever 16 downwardly against the bias of the spring 61 to a retracted position. On manual release of the activation lever 16 from the retracted position, the spring 61 moves the activation lever 16 to the extended position as shown in FIG. 3.

The pump mechanism 13 is schematically illustrated as having a piston chamber-forming tube 62 fixedly secured in an opening through the pump support plate 42 to extend downwardly and carrying a dip tube 63 fixedly secured in sealed relation and angled slightly forwardly. A piston member 64 is provided coaxially vertically slidably received within the piston chamber-forming tube 62 and biased upwardly by an internal pump spring 65. An upper end 66 of the piston member 64 engages with the actuation lever 16 via the bridging bar 58 extending between the side arm portions 56 and 57 such that the actuation lever 16 in movement from the extended to the retracted position will displace the piston member 64 axially into the piston chamber-forming tube 62 against the bias of the pump spring 65 to displace fluid through a central axial discharge passageway 68 in the piston member 64 which connects to the hollow interior of a discharge tube 69 so as to discharge fluid from the outlet 17. The piston member 64, discharge tube 69, and outlet 17 together move upwardly and downwardly relative the pump support plate 42. Such pump mechanisms are well known to include one-way valves and seals to provide proper pumping, however, for ease of illustration are not shown.

With movement of the activation lever 16, a dose amount of fluid is discharged from the outlet 17. With repeated activation of the pump mechanism fluid in the bottle 12 is dispensed out the outlet 17 and the level of fluid 54 in the bottle 12 will decrease as from the condition with a fluid level 54 at a height below the height of the emitter 44 but above the height of the sensor 46 as seen in FIG. 6 to a condition with the fluid level 54 at a height below the height of the sensor 44 as seen in FIG. 8.

The opening 22 of the bottle 12 is shown as disposed loosely about the piston member 64 and providing for communication between the atmosphere and the interior of the bottle. The bottle 12 may readily be removed by the lower end 18 of the bottle 12 being moved forwardly of the bottle support bracket 35. The dip tube 63 is preferably tilted forwardly to assist in permitting the bottle 12 to be slid vertically and rearwardly on to and off of the dip tube 63. The bottle 12, when in use, merely rests on the bottle support bracket 35 and may, to some extent, tip forwardly, for example, until the neck 21 may engage on the piston member 64.

The preferred embodiment in FIGS. 1 to 7 has been illustrated with a schematic pump mechanism 13 which is secured to the pump support plate 42 and not to the bottle 12. It is appreciated that many other removable and non-removable bottles and pumping mechanisms may be provided including those in which the pump mechanism is fixedly secured to the bottle and removable with the bottle. The particular nature of the pump mechanism 13 formed by the piston chamber-forming tube 62 and the piston member 64 is not essential and many different pump mechanisms may be adopted as known to persons skilled in the art.

Figure 13:
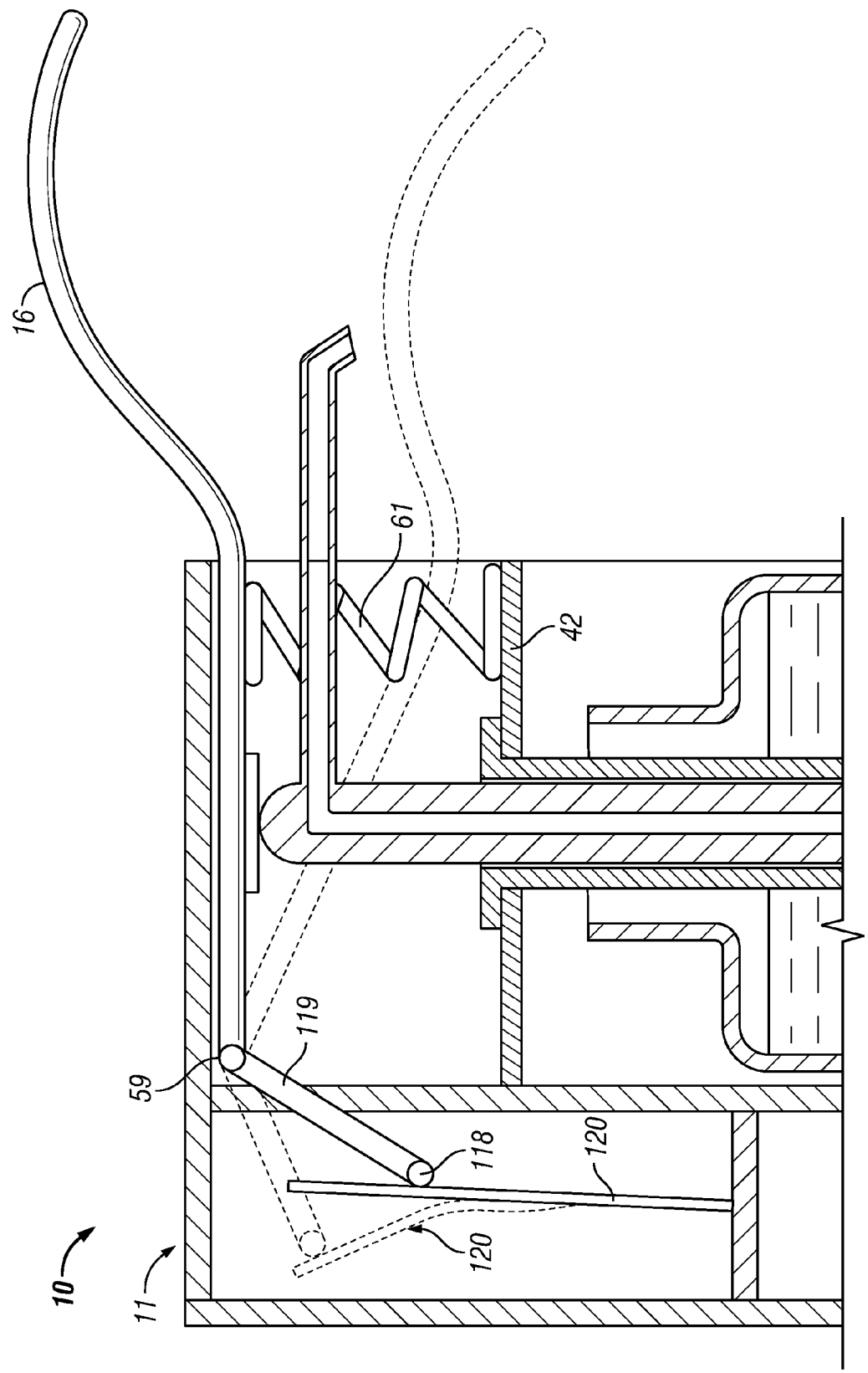
FIG. 13 is a schematic cross-sectional view similar to an upper portion of FIG. 3 but showing a fourth embodiment of a dispenser in accordance with the present invention.

FIG. 13 illustrates an embodiment of the invention which is identical to the first embodiment of FIGS. 1 to 7 with the exception that an electrical power generator 120 is coupled to the end 118 of a rigid extension 119 of the actuator 16 such that manual movement of the actuator 16 creates electrical power by deflecting a piezoelectric harvester 150 as in the manner of that described in the applicant's co-pending US Patent Publication US 2010/0288788 published Nov. 18, 2010 which is incorporated herein by reference. The electrical power generated by manual movement of the actuator 16 is used to operate the controller mechanism 55 and/or to charge any power sources.

Figure 14:
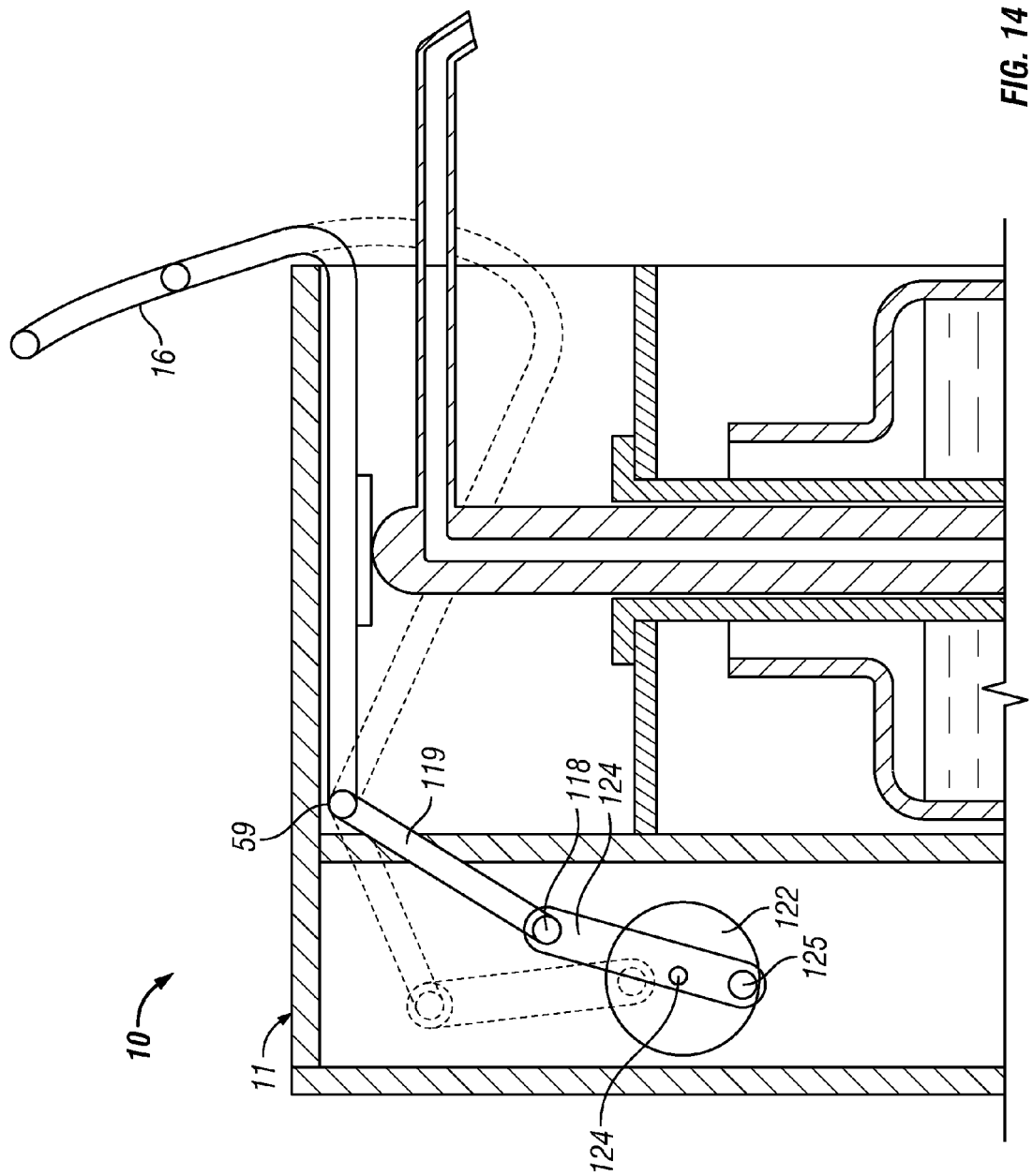
FIG. 14 is a schematic cross-sectional view similar to an upper portion of FIG. 3 but showing a fifth embodiment of a dispenser in accordance with the present invention.

FIG. 14 illustrates an embodiment of the invention which is identical to the first embodiment of FIGS. 1 to 7 with the exception that it is adapted for automated dispensing by providing an electric motor to rotate a wheel 122 about an axis 124 with an eccentric cam pin 125 carried on the wheel 122 coupled by a link 124 to an end 118 of a rigid extension 119 of the actuator to dispense fluid as activated by an activation switch, such as a manually operated switch carried on the cabinet 11 or a hand sensing switch disposed, for example, on the shroud 15 to sense a user's hand underneath the dispenser 10 vertically below the outlet 17.

In each of the first, second and third embodiments, the fluid level gauging mechanism 14 is shown as comprising a single circuit board 42 with a single emitter 44 and a single sensor 46 and in which the emitter 44 and sensor 46 are disposed at different vertical heights. Reference is made to FIGS. 15 to 18 which schematically illustrate a number of different configurations for the fluid level gauging mechanism 14. Each of FIGS. 15 to 18 schematically illustrate the wall 23 of the front side of the bottle spaced from a circuit board 42 carrying an emitter 44 and at least one sensor 46. For convenience, in FIGS. 15 to 18, each emitter is shown as a circle on each circuit board and each sensor is shown as a rectangular on each circuit board.

Figure 15:
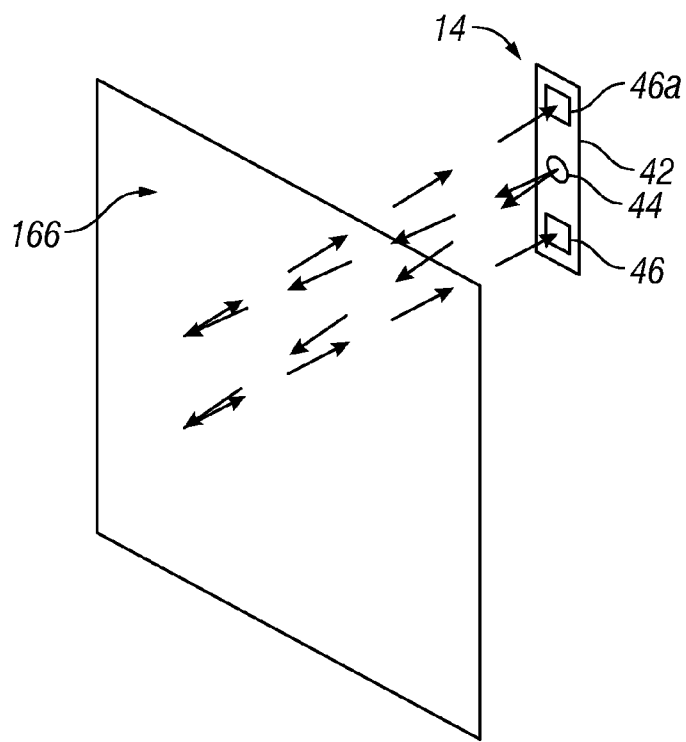
FIGS. 15, 16, 17 and 18 are schematic pictorial views showing alternate arrangements for radiation from an emitter to be reflected from a wall for sensing by a sensor.

In FIG. 15, a circuit board 42 carries the emitter 44 vertically above the sensor 46 in a manner substantially identical to that illustrated in the first, second and third embodiments. However, the circuit board 42 also carries a secondary sensor 46a disposed vertically above the emitter 44. The radiation received by the sensor 46 can determine when the liquid level is at a height intermediate the emitter 44 and the sensor 46. The radiation received by the sensor 46a can determine whether the fluid is at a height between the sensor 46a and the emitter 44. Thus, by providing a plurality of sensors at different locations relative to one emitter, that is, preferably at different heights as shown, the level gauging mechanism 14 can provide indications as to different heights of fluid in a bottle.

Figure 16:
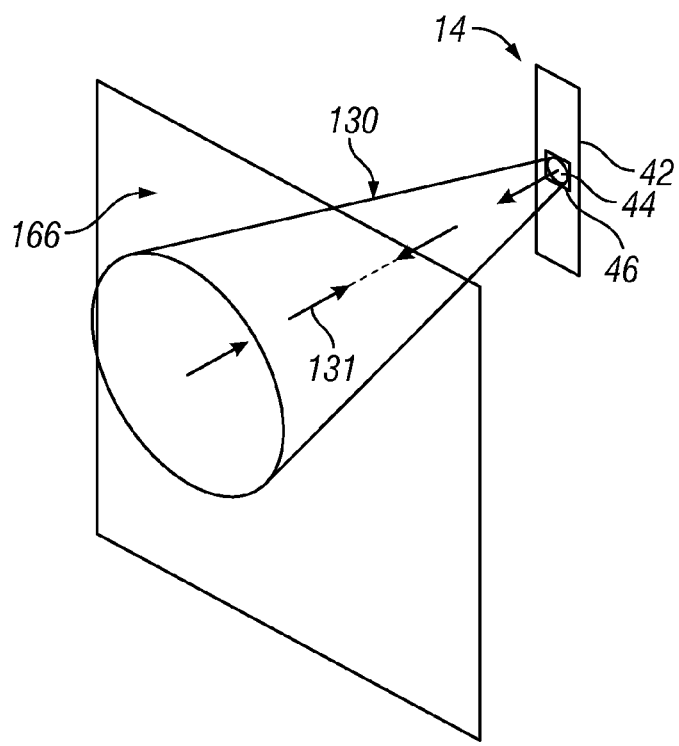

Reference is made to FIG. 16 which shows the emitter 44 as a circle and the sensor 46 as a rectangle coincident on the circle as in the case when a single element may serve a dual purpose of being both a sensor 46 and an emitter 44 located at the same location. In FIG. 16, the emitted radiation extends towards the wall 23 along the same path 131 that the reflected radiation travels. The arrangement in FIG. 16 can be used in each of the first, second and third embodiments to sense the fluid level, however, will provide in the context of a chart shown in FIG. 10 a much sharper transition in the plot of fluid height in a bottle versus reflected radiation sensed. FIG. 16 also schematically illustrates a cone 130 representing the radiation as emitted from the emitter 44 as it travels outwardly from the emitter 44. Different emitters may irradiate radiation at different angles about a center line 131 and a relative angle of the cone 130 of emission may be selected to be narrower or wider having regard to the surfaces from which radiation is desired to be reflected.

Figure 17:
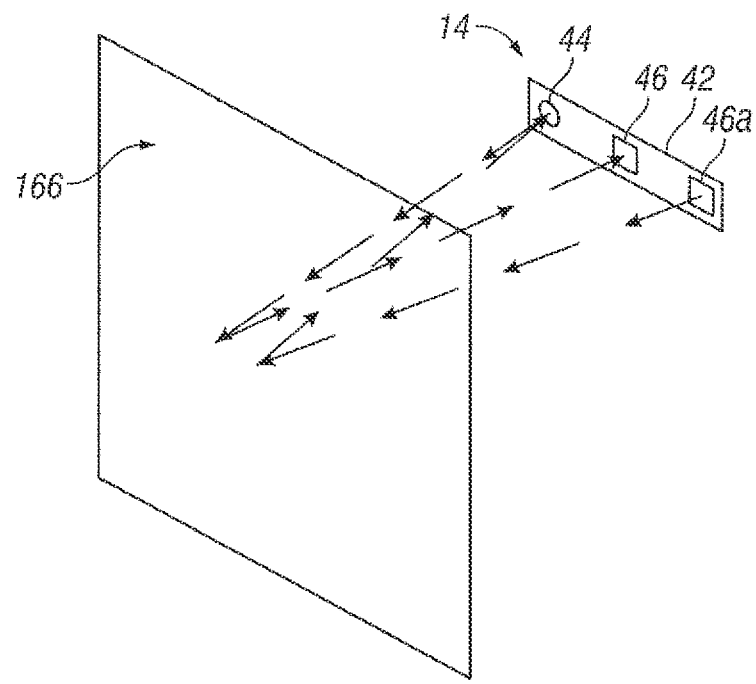

Reference is made to FIG. 17 which shows an arrangement with the circuit board 42 carrying an emitter 44 and two horizontally spaced sensors 46 and 46a, however, in this case with the sensor 46a further from the emitter 44 than the sensor 46.

Figure 18:
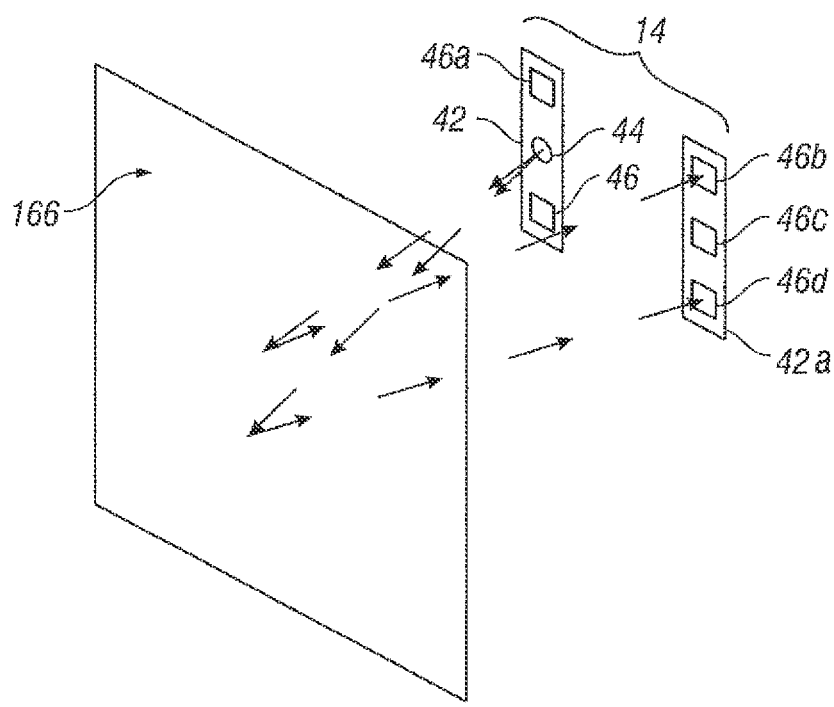

Reference is made to FIG. 18 which shows an arrangement the same as in FIG. 15, however, with a second circuit board 42a spaced to one side beside the first circuit board 42. The second circuit board 42a is shown as carrying three additional sensors 46b, 46c and 46d. Radiation from the emitter 44 may be received by each of the sensors 46, 46a, 46b, 46c and 46d, however, reflective paths are shown merely for radiation to be received by sensors 46b and 46d.

Figure 19:
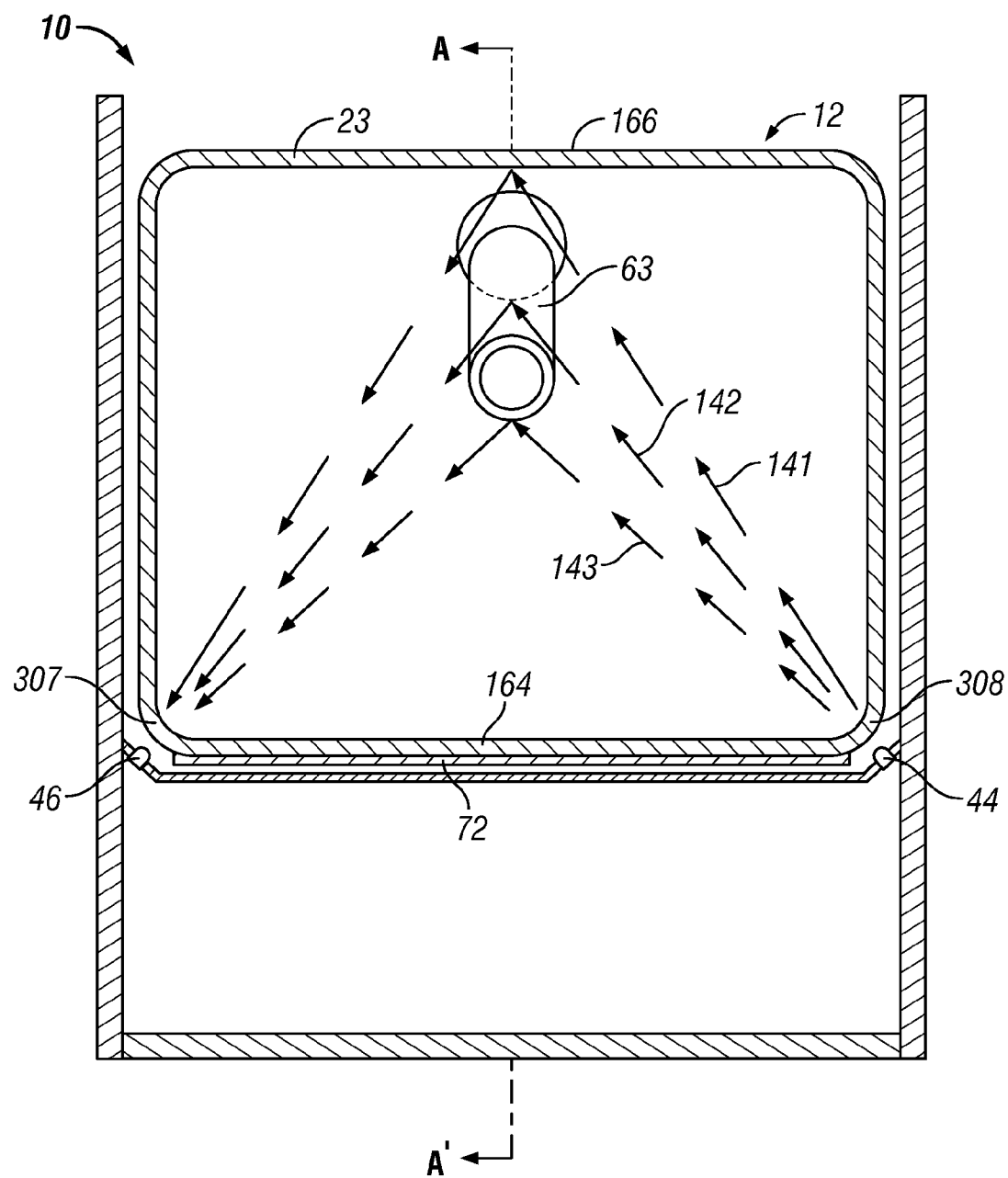
FIG. 19 is a schematic cross-sectional view similar to FIG. 4 but showing a sixth embodiment of a dispenser in accordance with the present invention with the emitter and the sensor located at the corners of the bottle.
Figure 20:
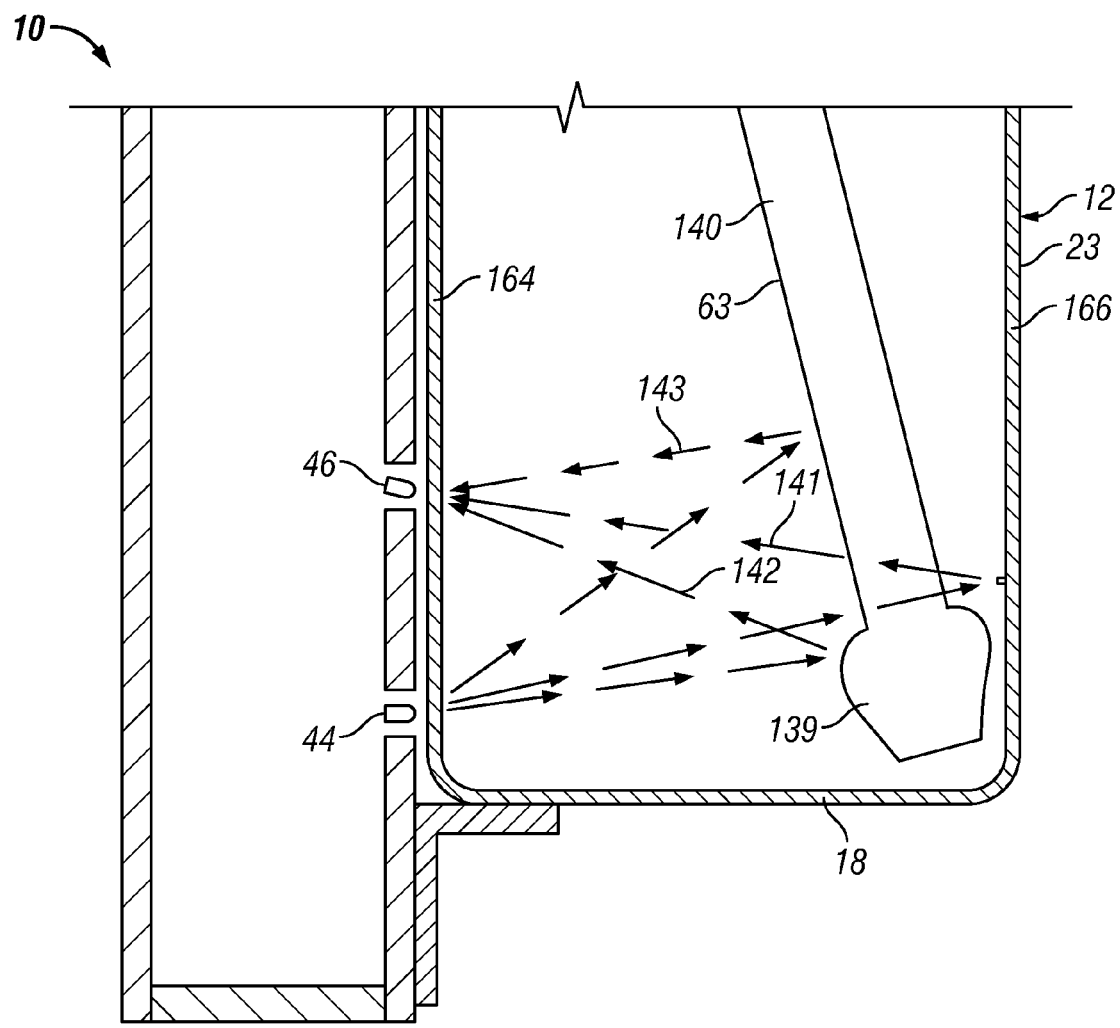
FIG. 20 is a schematic vertical cross-sectional view along section line A-A' in FIG. 19.

Reference is made to FIGS. 19 and 20 which illustrate views of a sixth embodiment of a dispenser in accordance with the present invention. FIGS. 19 and 20 comprise, respectively, a top cross-sectional view and a side cross-sectional view substantially the same as those shown in FIGS. 4 and 5 with the first embodiment. The sixth embodiment of FIGS. 19 and 20 differs from the first embodiment of FIGS. 4 and 5 in that the emitter 44 and the sensor 46 are each disposed adjacent a rear corner of the bottle 12, outwardly of a rear label 72 carried on the exterior surface of the wall 23 on the rear side of the bottle 12. The sensor 46 and emitter 44 are shown at respective rear corners 307 and 308 at locations which avoids the label 72. FIG. 20 is a schematic side view of the embodiment shown in FIG. 19 along section line A-A'. Along this section line A-A', neither of the emitter 44 or the sensor 46 would be seen and thus, for convenience of illustration, the relative height and location of the emitter 44 and sensor 46 is shown and, as well, the label 42 shown as cut away. Further, the dip tube 63 is not shown in cross-section. In FIGS. 19 and 20, three different paths for radiation emitted from the emitter 44 are shown by which radiation may be reflected internally within the bottle 12 so as to be received by the sensor 46. A first path indicated by the longest arrows 141 is reflected off the wall 23 of the bottle 12 on the diametrically opposite front. A second path shown by intermediate length arrows 142 is reflected off a bulbous concave end 139 of the dip tube 63. A third path shown by the shortest arrows 143 is reflected off a cylindrical stem 140 of the dip tube 63. It is to be appreciated that in order to have reflection along all three reflective paths, then the cone of emission from the emitter 44 needs to be directed at a sufficient angle to include each of the two most divergent paths, second and third paths represented by arrows 142 and 143. As a variant, the emitter 44 may have a smaller cone of emission and, for example, merely provide for emission along the first and second paths indicated by arrows 141 and 142.

The arrangement illustrated in the sixth embodiment of FIGS. 19 and 20 is advantageous so as to permit the bottle 12 to carry a rear label 72 provided the label 72 does not extend as far as the rear corners 307 and 308 where the emitter 44 and sensor 46 are located. The arrangement also has the advantage of permitting the mechanism 14 to determine whether or not the dip tube 63 is present and to determine the nature of the dip tube 63. For example, the dip tube 63 could have different configurations providing for increased or decreased reflection and the dip tube 63 may be chosen to have surfaces which, to different extents, reflect or absorb the radiation be emitted. Thus, by suitable selection of the radiation emitted, the configuration or reflectance or absorbency of the dip tube, determinations can be made from the reflected radiation sensed as to which dip tube may be present. By having the nature of a dip tube correlate to a particular bottle 12 or a particular fluid within a bottle 12, the mechanism 14 may thus provide feedback as to the nature of the dip tube and its associated bottle and/or fluid.

Figure 21:
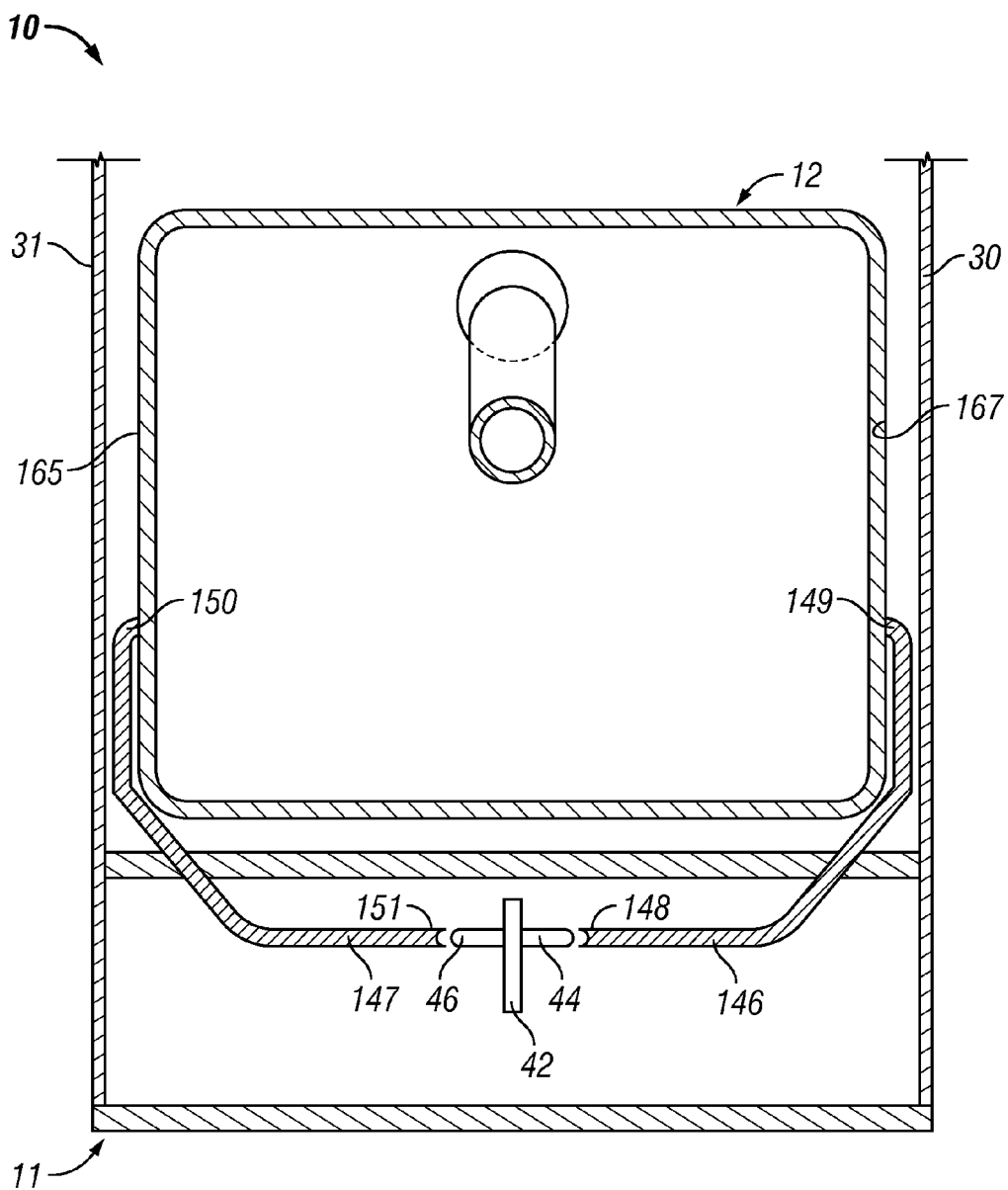
FIG. 21 is schematic cross-sectional view similar to FIG. 4 but illustrating a seventh embodiment of a dispenser in accordance with the present invention using light guides.

Reference is made to FIG. 21 which illustrates a seventh embodiment of a dispenser in accordance with the present invention. FIG. 21 is a cross-sectional top view substantially the same as FIG. 4, however, with the notable difference that the circuit board 42 and the emitter 44 and sensor 46 now comprise a vertically disposed circuit board 42 carrying the emitter 44 and the sensor 46 on opposite sides each disposed away from each other. An emitter light guide 146 and a sensor light guide 147 are provided. The emitter waveguide 146 provides a conduit for the emitted radiation. The emitter waveguide 146 has an inlet 148 to receive radiation from the emitter 144 and to transmit the radiation to an outlet 149 disposed on the left side 167 of the bottle 12. In this regard, the emitter waveguide 146 extends inwardly of the side plate 30 of the housing 11. The sensor light guide 147 has an inlet 150 on the right side 165 of the bottle 12 adapted to receive radiation from the outlet 149 of the emitter light tube 146. The sensor waveguide 147 transmits radiation from its inlet 150 to its outlet 151 from which radiation is transmitted to the sensor 46. The sensor waveguide 147 also extends inside of the side plate 31 of the housing 11. These waveguides 146 and 147 are provided as in the context of the embodiment illustrated so as to effectively locate the place of emission of the radiation and place of sensing of the radiation at convenient locations when, for example, the side plates 30 and 31 of the housing 11 do not have a depth or thickness which permits easy location of the emitter 44 or sensor 46 at the left and right side. In the embodiment of FIG. 21, the outlet 149 of the emitter waveguide 146 and the inlet 150 of the sensor waveguide 147 may be disposed at the same height or, preferably, at different heights. Of course, it is within the scope of the present invention that merely one waveguide be provided for one of the emitter and sensor at one location and, for example, the other of the emitter or sensor be provided at a different location without a waveguide. Similarly, where a single element may comprise both a sensor and an emitter, merely one waveguide may need to be provided. FIG. 21 illustrates an arrangement where the radiation path is direct across the bottle 12 from the outlet 149 to the inlet 150 without any reflectance. With such an arrangement, a chart of fluid height against radiation sensed as in FIG. 10 will have a relatively shorter intermediate segment 102.

Figure 22:
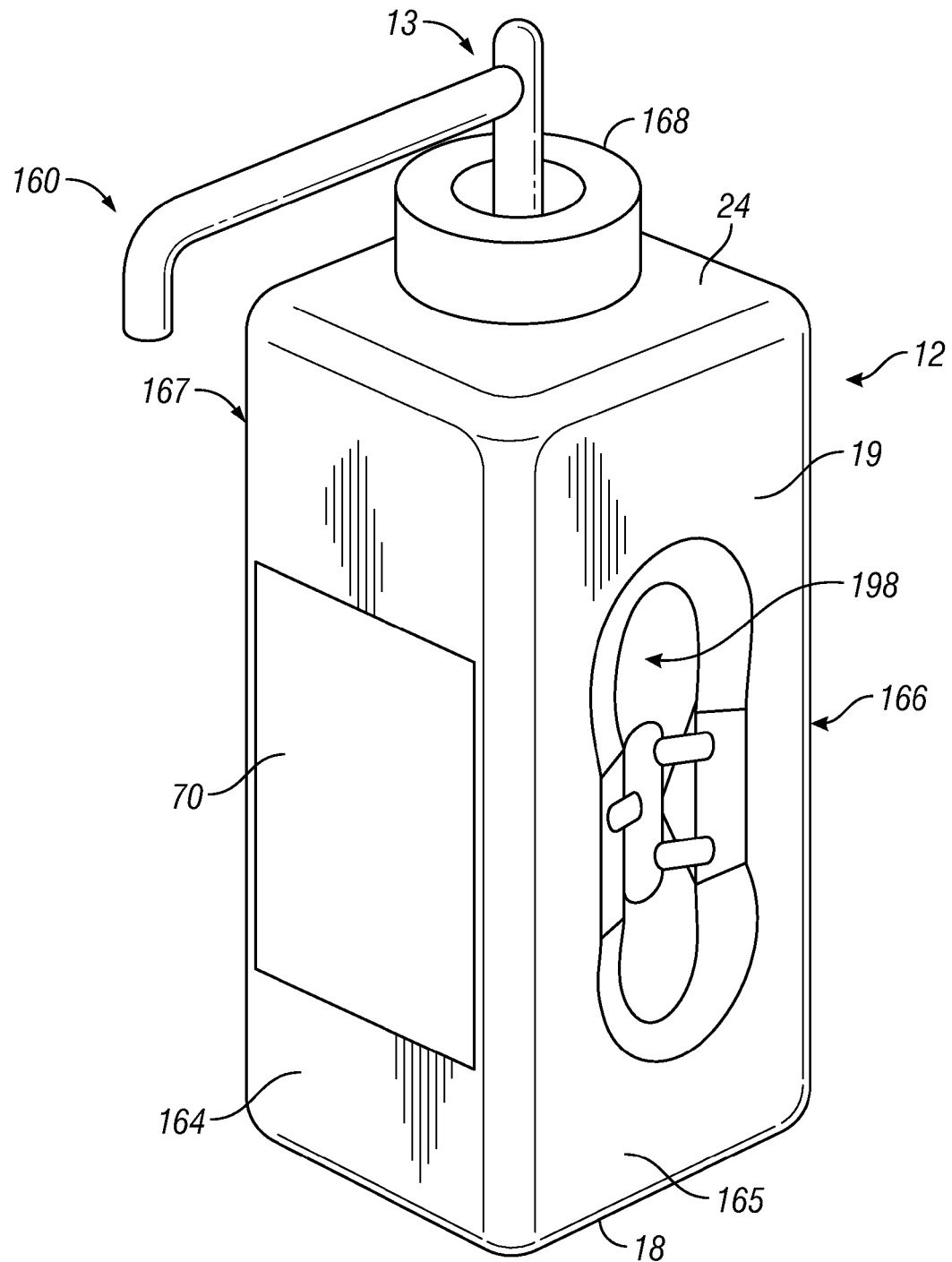
FIG. 22 is a pictorial front view of a bottle and pump assembly for use with a dispenser in accordance with an eighth embodiment of the present invention.
Figure 23:
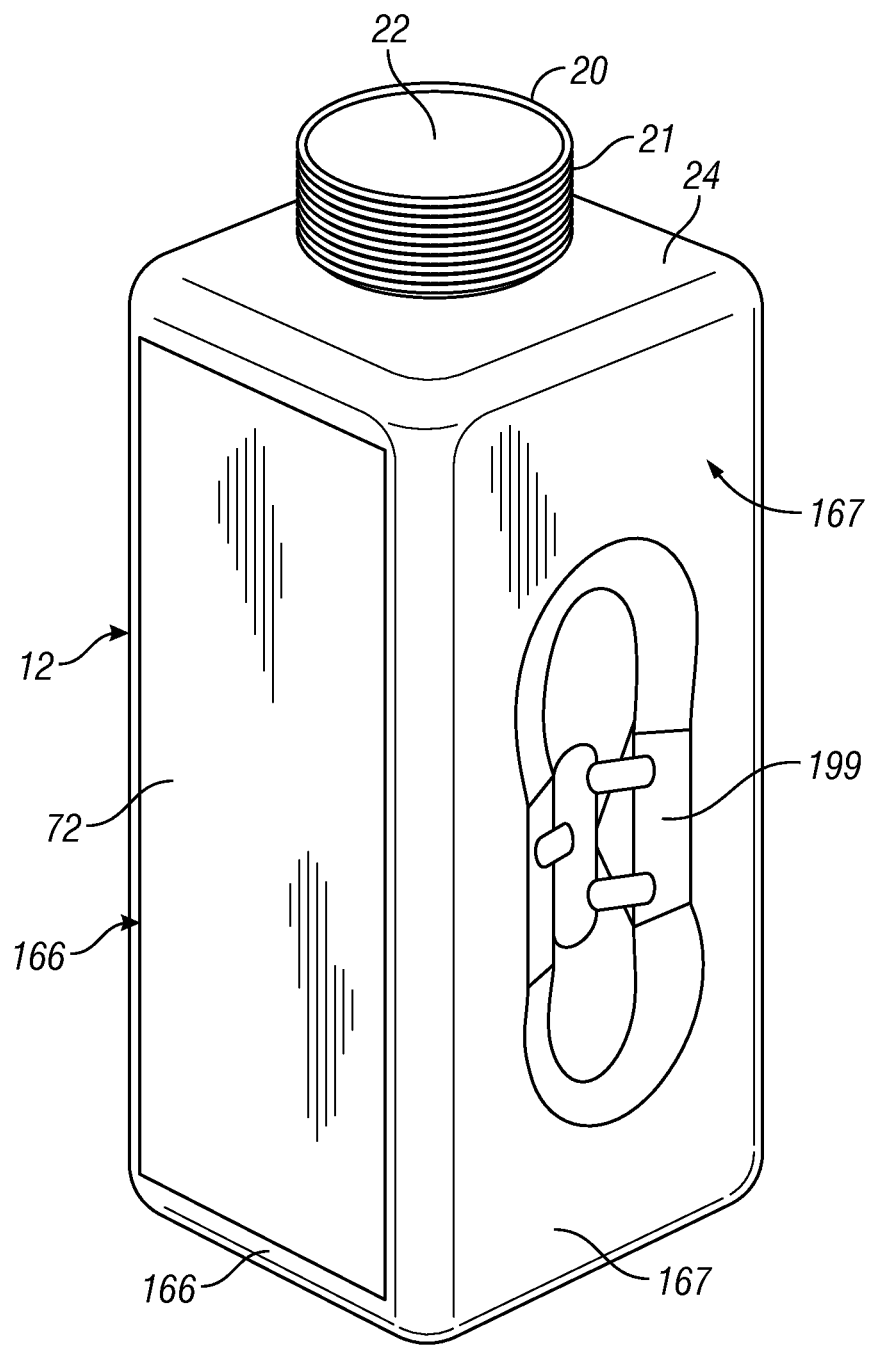
FIG. 23 is a pictorial rear view of the bottle shown in FIG. 22.

Reference is made to FIGS. 22 to 34 which illustrates a fluid dispenser 10 in accordance with an eighth embodiment of the present invention and components therefore. FIG. 22 shows a front pictorial view of a bottle and pump assembly 160 for use in the dispenser of this eighth embodiment. The assembly 160 includes a bottle 12 and a pump mechanism 13. The bottle 12 has a configuration with similarities to that of the bottle 12 illustrated in the first embodiment. The bottle is closed at its bottom 18. Sides 19 of the bottle extend upwardly from the bottom 18 to an upper end 20 having the shoulder 24 and an upstanding neck 21 with an opening 22. The bottle 12 has a thin wall 23 which forms the bottom 18, sides 19, shoulder 24 and the neck 21. The wall 23 defines a cavity 25 within the bottle 12 in which fluid to be dispensed is to be contained. The wall 23 has an outwardly directed exterior surface 26 and an interior surface 27 which faces inwardly into the cavity 25. The upstanding neck 21 carries threads 161.

Figure 26:
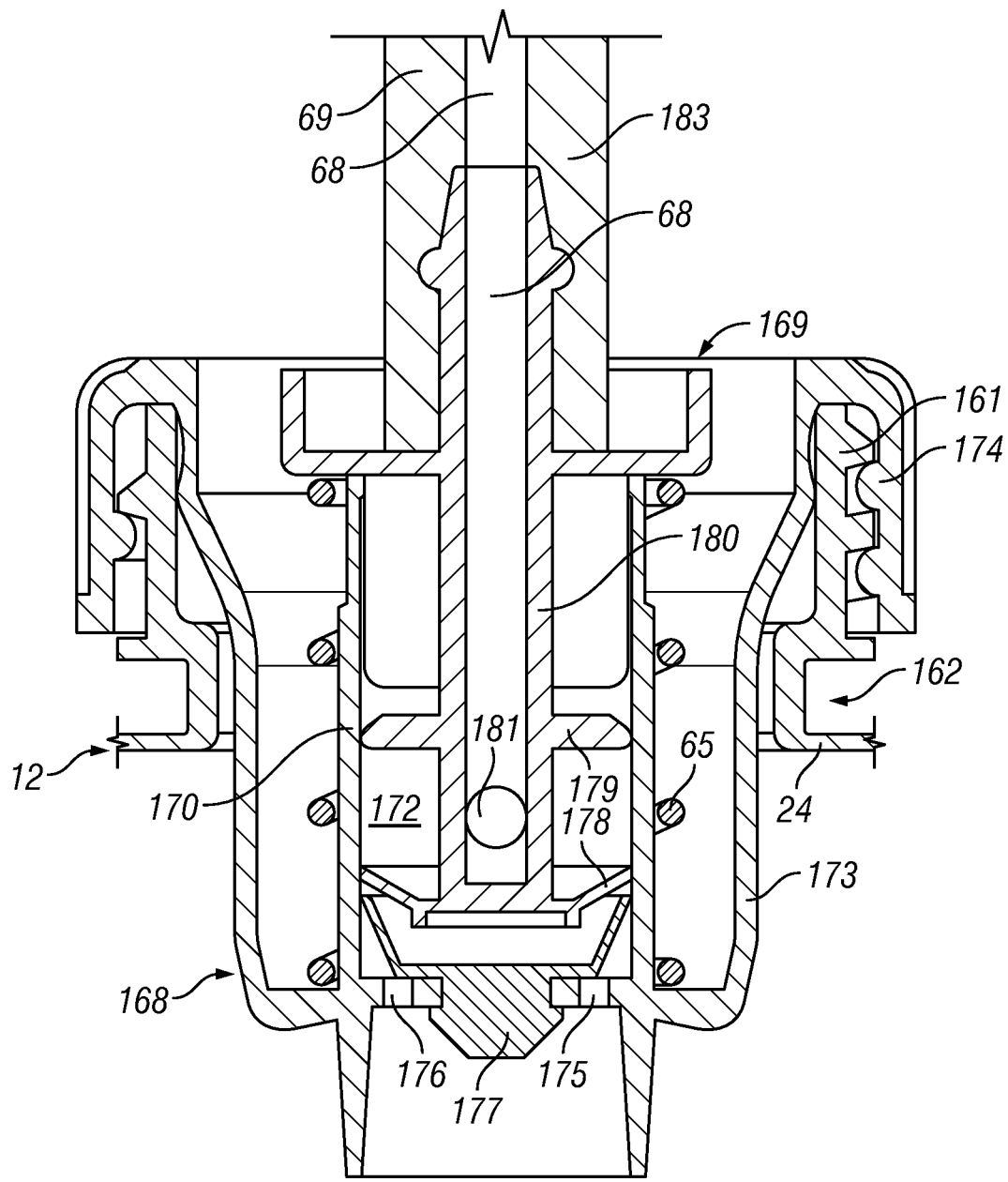
FIG. 26 is an enlarged cross-sectional side view of the pump mechanism as seen in FIG. 24.

As best seen in FIG. 26, a radially inwardly extending annular groove is provided between the shoulders 24 of the bottle 12 and the threads 161. The bottle is indicated as having a front side 164, a right side 165, a rear side 166 and a left side 167. A front label 70 is applied to the front side 164 and a rear label 72 is applied to the rear side 166.

Figure 24:
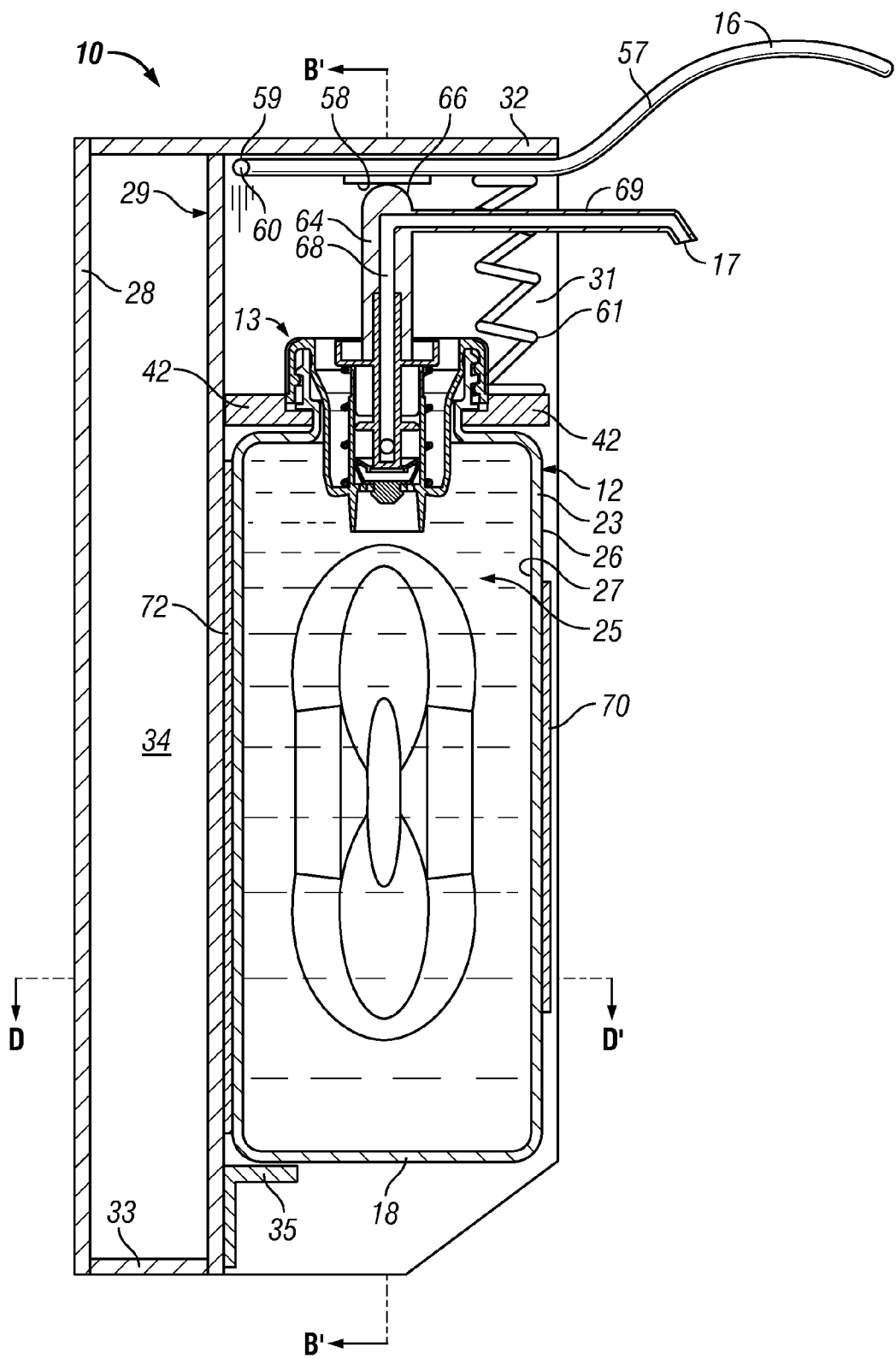
FIG. 24 is a schematic cross-sectional side view of a dispenser in accordance with an eighth embodiment of the present invention and identical to that shown in FIG. 3 but with the bottle and pump assembly of FIG. 22 substituted for the bottle and pump mechanism from FIG. 3 and showing the bottle filled with fluid to be dispensed.

The pump mechanism 13 may be best seen in cross-section in FIG. 24 and in the exploded view of the cross-section from FIG. 24 in FIG. 26. The pump mechanism 13 comprises a piston chamber-forming body 168 and a piston-forming element 169 disposed for reciprocal sliding relative to the piston chamber-forming body 168. The piston chamber-forming body 168 defines within an inner cylindrical wall 170 a piston chamber 172. The inner cylindrical wall 170 is connected via an intermediate wall 173 to an outer flange 174 adapted to be sealably threadably engaged onto the neck 21 of the bottle 12. An inner end wall 175 of the piston chamber 172 has opening 176 for communication with fluid inside the bottle 12. A one-way valve 177 provides for flow merely outwardly through the openings 176. The piston-forming element 169 carries a resilient inner disc 178 which engages the cylindrical wall 170 to permit fluid flow outwardly therepast yet to prevent fluid flow inwardly. An outer sealing disc 179 is carried on a hollow stem 180 of the piston-forming element 169 outwardly of the inner disc 178 to prevent fluid flow outwardly therepast. With reciprocal movement of the piston-forming element 169 relative to the piston chamber-forming body 168, fluid is drawn into the piston chamber 172 from inside the bottle 12 and discharged from between the inner sealing disc 178 and the outer sealing disc 179 via an opening 181 through the cylindrical stem 180 into a discharge passageway 68 inside the piston-forming element 169. The piston-forming element 169 includes a hollow discharge tube 69 which extends the discharge passageway 68 to an outlet 17 from which fluid is to be dispensed. As in the first embodiment, an internal pump spring 65 is provided to bias the piston-forming element 169 upwardly and axially outwardly relative to the piston chamber-forming body 168.

The pump mechanism 13 shown in FIGS. 24 and 26 is of a type illustrated in U.S. Pat. No. 5,282,552 to Ophardt, issued Feb. 1, 1994, the disclosure of which is incorporated herein by reference. Various other pump mechanisms may be used.

The assembly 160 comprising the bottle 12 and the pump mechanism 13 is a removable assembly which can be removed from the dispenser 12 for replacement after the bottle 12 may be emptied of its fluid. In this regard, the pump support plate 42 is provided with a stepped central opening providing a lower plate portion to be received within the groove 162 about the neck 21 of the bottle 12. The pump support plate 42 has a slotway opened forwardly by which the assembly 160 can be slid rearwardly to resiliently engage the groove 162 about the neck 21 of the bottle 12 to the support plate 42. The pump support plate 42, as seen in FIG. 3, also provides for secured removal and engagement of the pump mechanism 13 shown in the first embodiment independent of the bottle 12 in the first embodiment. Thus, the dispensers 12 shown in the first embodiment and in the eight embodiment shown in FIG. 24 are interchangeable and adapted to receive either bottle 12 as in FIG. 3 which is open to the atmosphere and the bottle 12 as shown in FIG. 24 which is sealably engaged with the pump mechanism 13.

In the eighth embodiment of the invention, the bottle 12 is shown to be a collapsible bottle with the pump mechanism 13 creating a vacuum in the bottle on dispensing fluid such that the bottle collapses, however, this is not necessary. The bottle 12 in the eighth embodiment as shown in FIG. 24 could have its pump mechanism 13 modified so as to provide for atmospheric air to enter the bottle on fluid being dispensed from the bottle as with various vacuum relief and venting arrangements as are known to a person skilled in the art. However, in the preferred arrangement as illustrated in the eighth embodiment, on dispensing fluid from within the bottle 12, air is not permitted to enter the bottle and the vacuum is created within the bottle 12 which attempts to collapse the bottle.

The bottle 12 in the eighth embodiment is preferably a collapsible bottle, that is, a collapsible bottle as disclosed in U.S. Patent Application Publication US 2009/0114679 to Ophardt et al published May 7, 2009, the disclosure of which is incorporated herein by reference.

The bottle 12 is collapsible in a manner that at least one dimension of the bottle varies as the bottle 12 collapses from a full position to an empty position. The right side 165 and the left side 167 of the bottle 12 each carry a recessed portion referred to as a valley 198 on the right side 165 and a valley 199 on the left side 167. These valleys 198 and 199 provide the bottle 12 with a propensity to collapse in a substantially controlled manner as seen in the side view from a full bottle condition shown in FIG. 24 to a collapsed bottle condition shown in FIG. 25.

Figure 25:
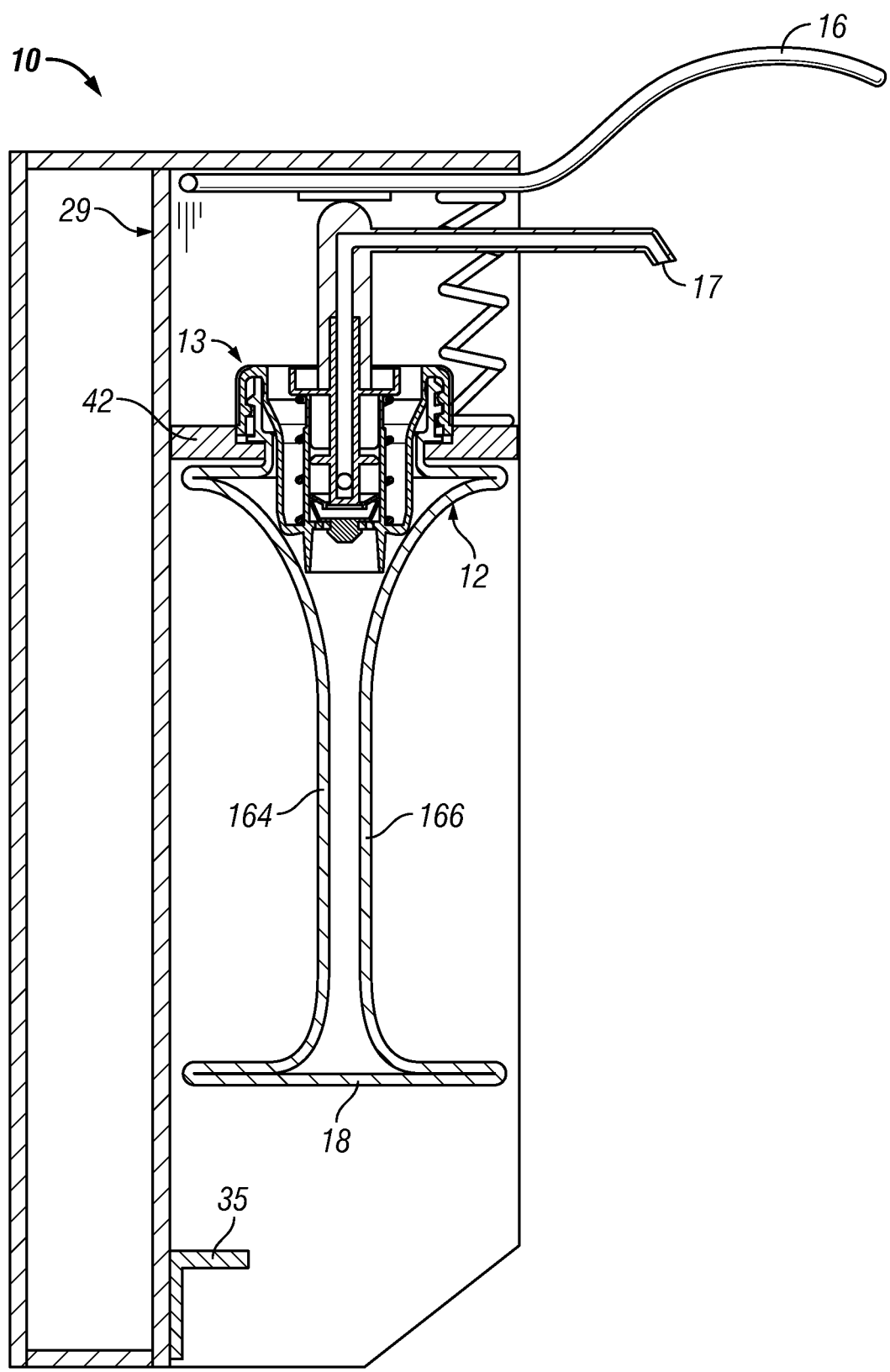
FIG. 25 is a schematic cross-sectional view of the eighth embodiment of the dispenser shown in FIG. 24, however, with the bottle substantially collapsed.
Figure 27:
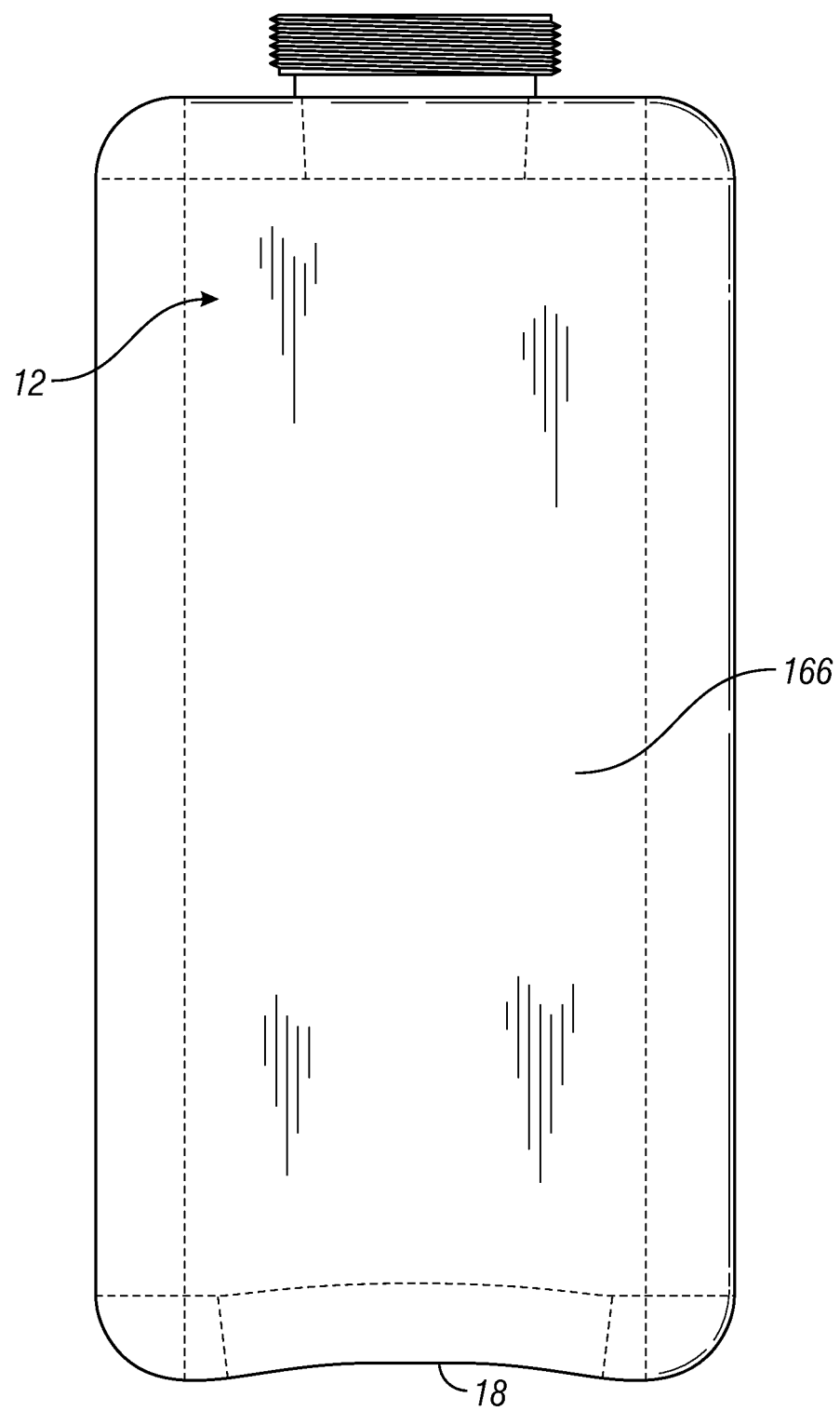
FIG. 27 is a front view of the bottle in a full condition as seen in FIG. 24.
Figure 28:
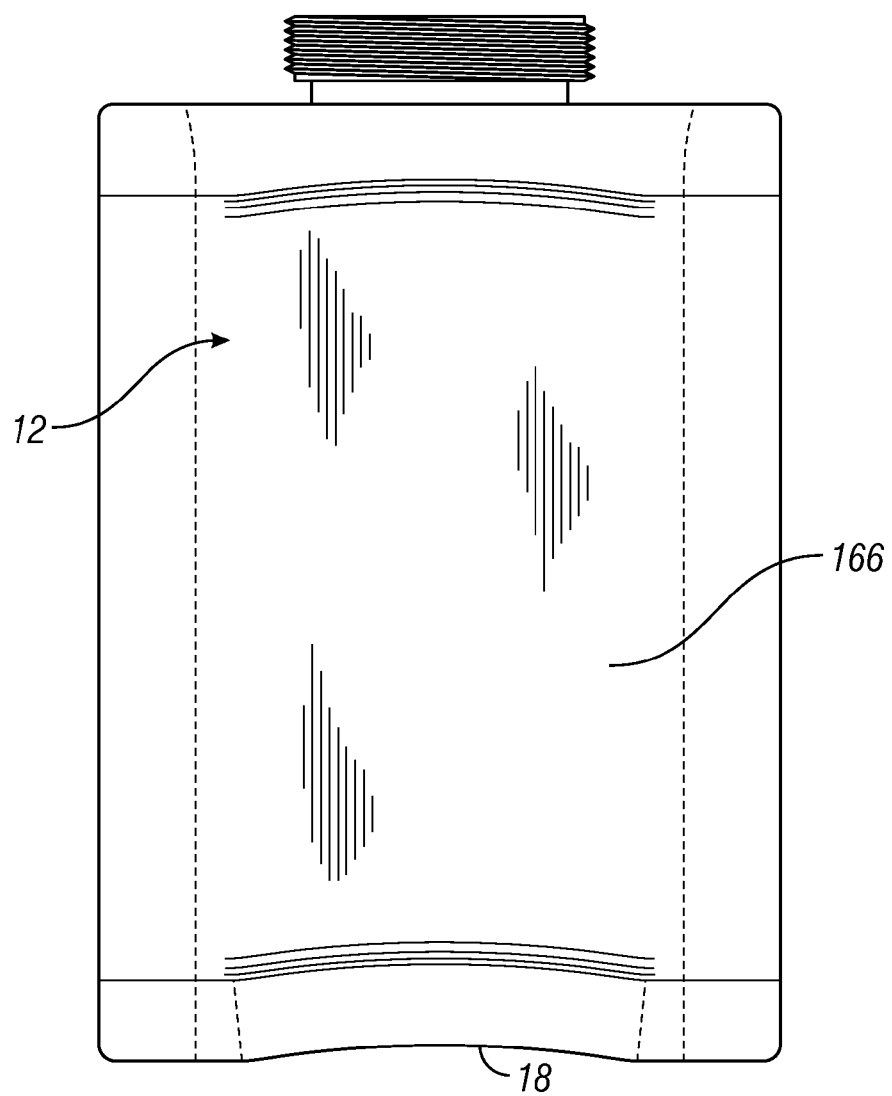
FIG. 28 is a front view of the bottle in a collapsed position as seen in FIG. 25.
Figure 29:
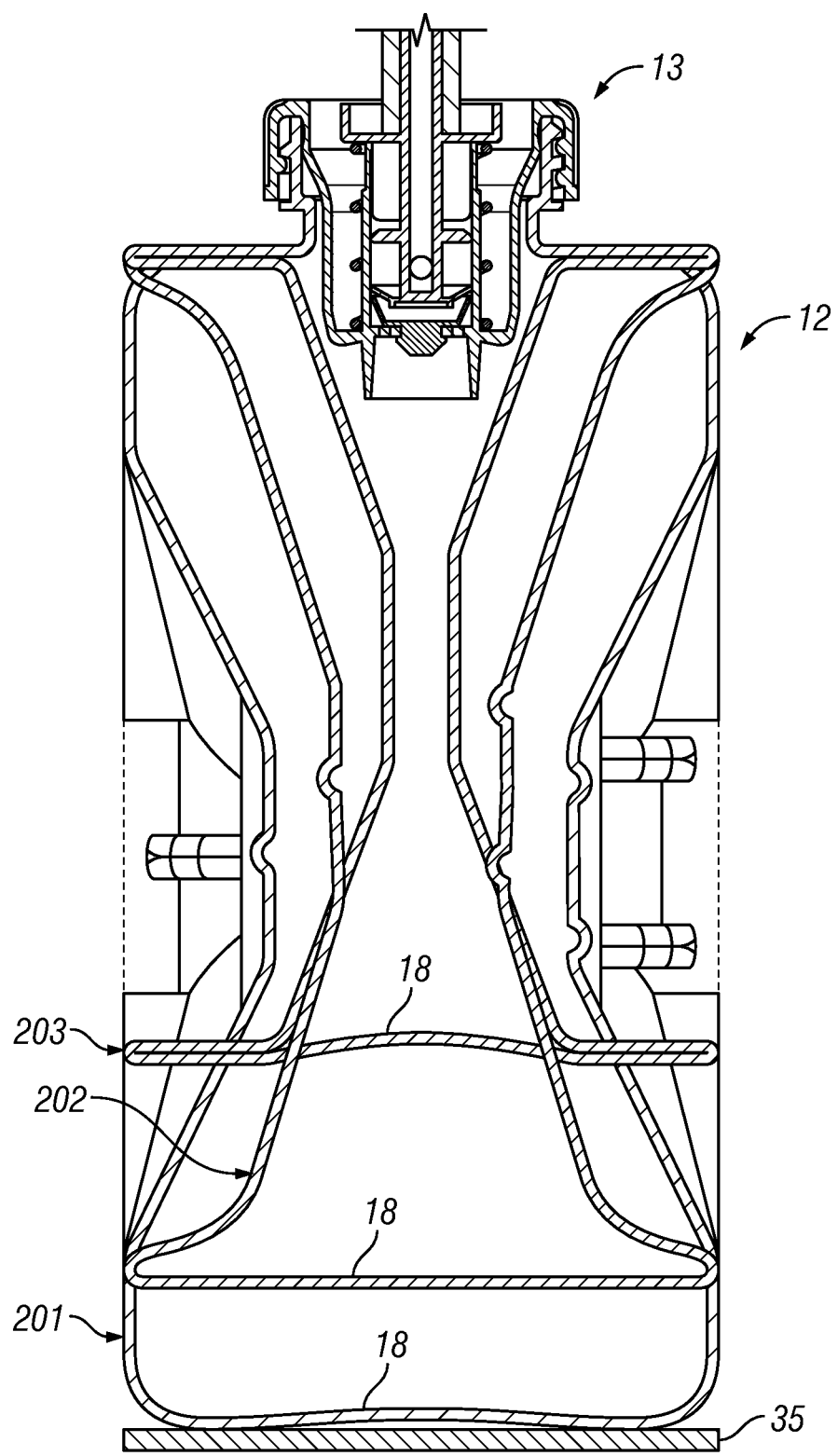
FIG. 29 is a cross-sectional side view of the bottle and pump assembly shown in FIG. 24 along center line B-B' in FIG. 24 showing, however, the bottle in a full condition, a partially collapsed condition and a fully collapsed condition.

FIG. 27 illustrates a front view of the bottle in a full view as seen in FIG. 24 and FIG. 28 illustrates a front view of the bottle as in a collapsed position as seen in FIG. 25. FIG. 29 illustrates a cross-sectional front view as along section line B-B' in FIG. 24 showing as a first profile indicated as 201 a condition of the bottle in a full position as seen in FIG. 24. FIG. 29 shows in a third profile indicated as 203 a condition of the bottle in the collapsed position as shown in FIG. 25. FIG. 29 shows in a second profile indicated as 202 a condition of the bottle in a partially collapsed position intermediate the full profile 201 and the collapsed profile 203. In FIG. 29, it is seen that the bottom 18 of the bottle in the full profile 201 is at a lowermost position proximate the bottle support bracket 35. With emptying of the bottle 12 and collapse of the bottle, the bottom 18 of the bottle 12 progressively moves upwardly to the intermediate position of the bottom 18 shown on profile 202 and then to the higher position of the bottom 18 as seen in the more fully collapsed profile 203.

Figure 30:
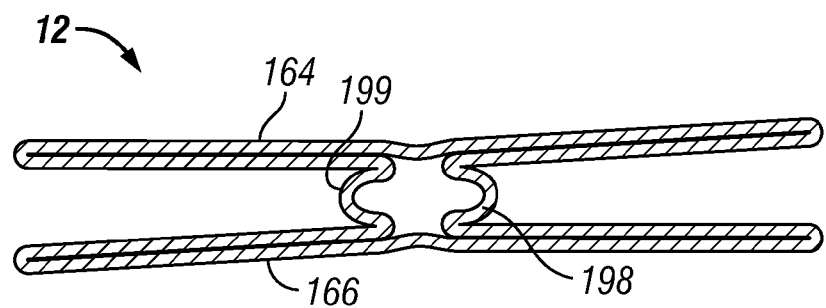
FIG. 30, on the sheet with FIG. 28, is a cross-sectional top view through the collapsed bottle shown in FIG. 25 along section line C-C'.

FIG. 30 illustrates a horizontal cross-sectional view through the collapsed bottle of FIG. 25 along section C-C' showing that each of the front side 164 and the rear side 166 have been drawn together with each of right side 165 and the left side 167 folded about the centers of their respective valleys indicated as 198 and 199.

Figure 31:
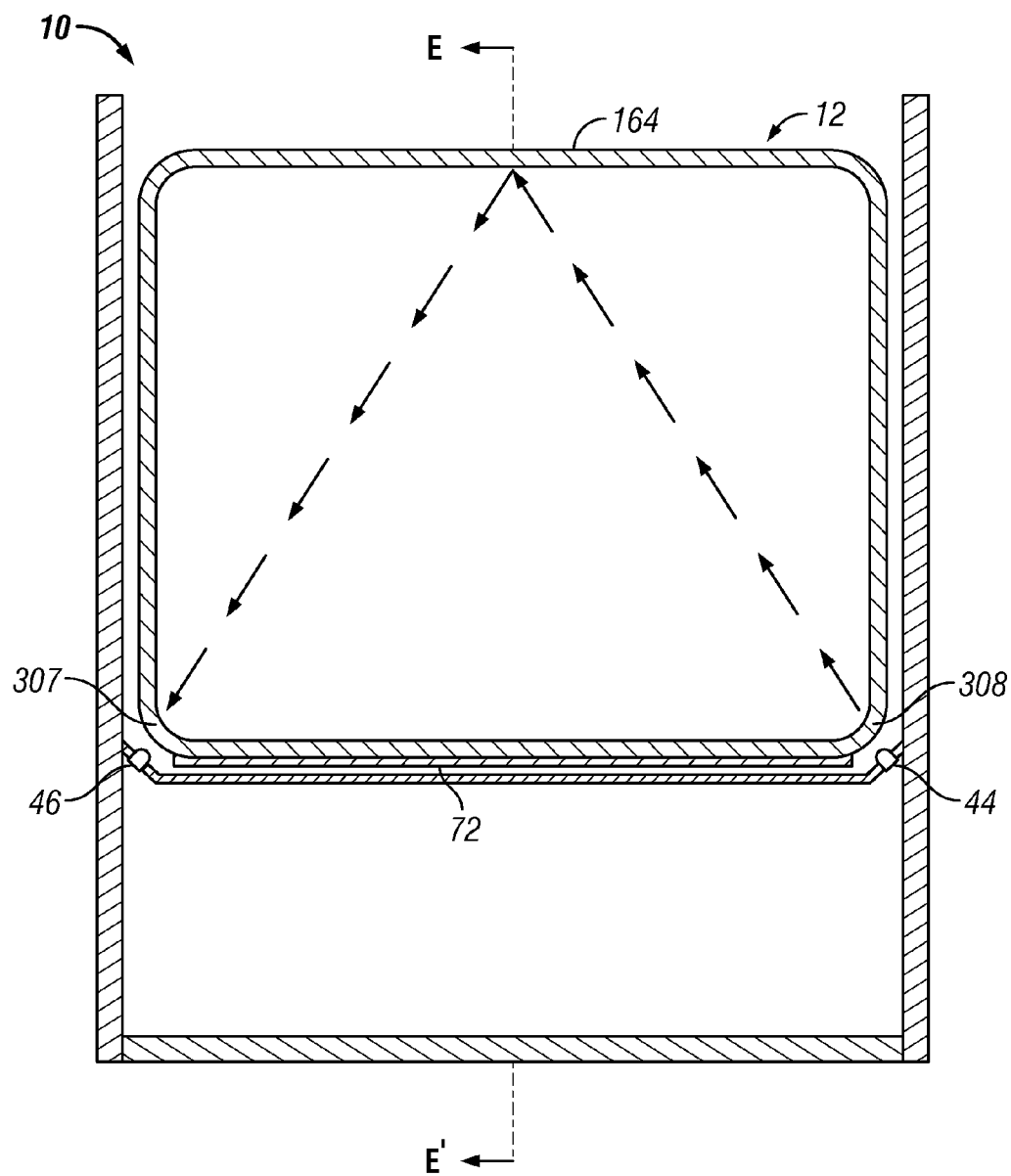
FIG. 31 is a cross-sectional top view of the dispenser of FIG. 24 along section line D-D' in FIG. 24.
Figure 32:
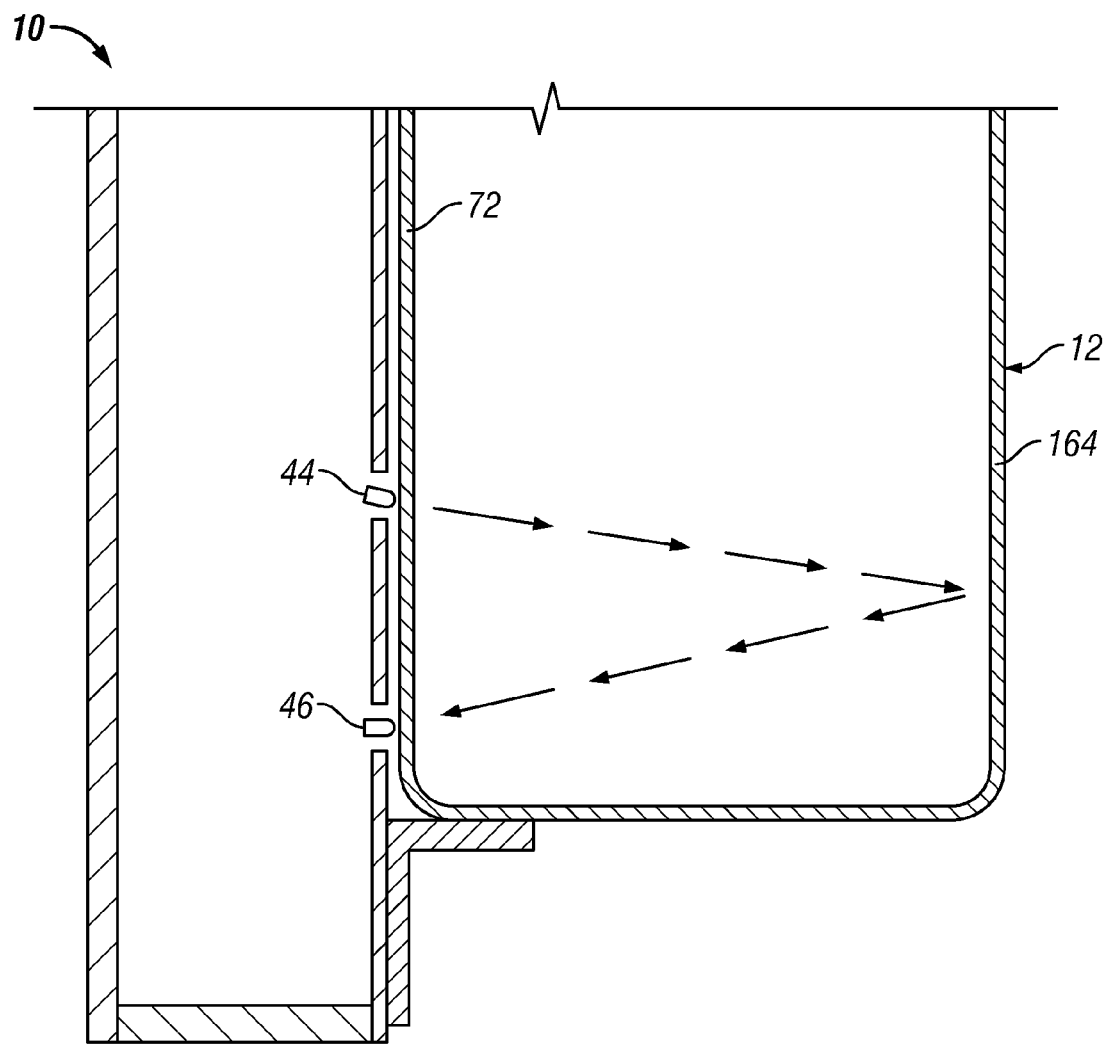
FIG. 32 is a schematic vertical cross-sectional side view along section line E-E' in FIG. 31.

Reference is made to FIG. 31 which illustrates a horizontal cross-section through section line D-D' in FIG. 24 and to FIG. 32 showing a vertical cross-section through section line E-E' in FIG. 31. FIGS. 31 and 32 show views substantially the same as those shown in FIGS. 19 and 20, respectively, however, in the context of a collapsible bottle which does not include a dip tube. In each of FIGS. 31 and 32, the bottle is full in FIG. 24. As seen in FIG. 32, at one rear corner 308 of the bottle an emitter 44 is provided and, at the other rear corner 307 at a height different than the emitter 44, a sensor 46 is provided. Radiation from the emitter 44 reflects off the front side 164 to be sensed by the sensor 46.

Figure 33:
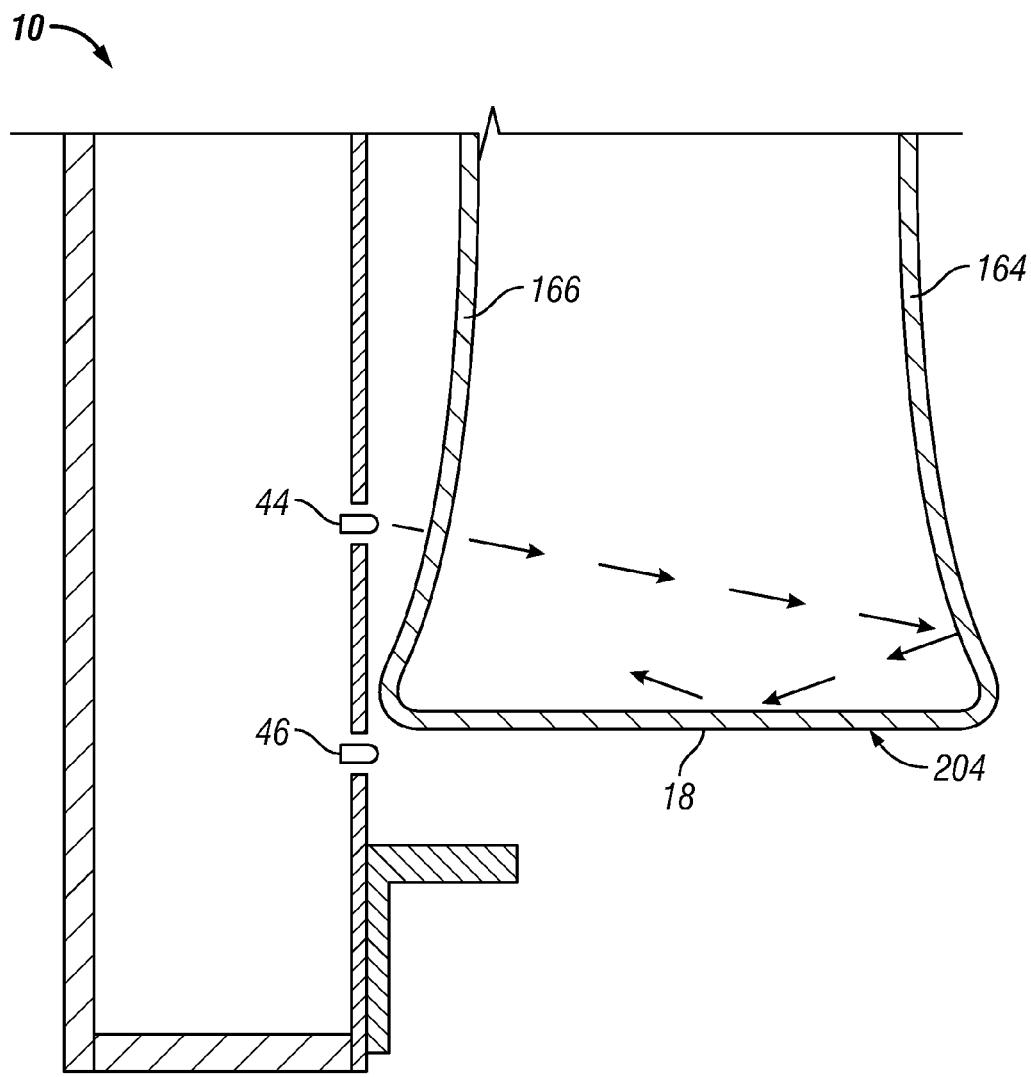
FIG. 33 is a cross-sectional side view the same as FIG. 32, however, showing the bottle in a partially collapsed position.

FIG. 33 is a cross-sectional view identical to that shown in FIG. 32 *with* the exception that the bottle 12 has been collapsed by withdrawal of fluid. In FIG. 33, profile 204 for the bottle is shown at a point when the bottom 18 of the bottle 12 has moved upwardly to above the height of the sensor 46 at which point substantially no radiation from the emitter 44 would reach the sensor 46. On the bottom 18 coming to be raised above the sensor 46, the amount of radiation received by the sensor will be significantly reduced as compared to the radiation sensed when the bottom 18 is below the sensor 46. This significant drop in radiation can be sensed and used as an indication of the extent to which fluid has been withdrawn from the bottle. This correlation is possible insofar as on a probability basis there is a relationship between the volume dispensed from the bottle and the vertical location of the bottom wall 18. The arrangement of emitters 44 and sensors 46 as shown in FIGS. 31 and 32 is identical to that shown in FIGS. 19 and 20 and therefore the same sensing mechanism can be used to make determinations as to the fluid level in each of a non-collapsible bottle and a collapsible bottle.

Figure 34:
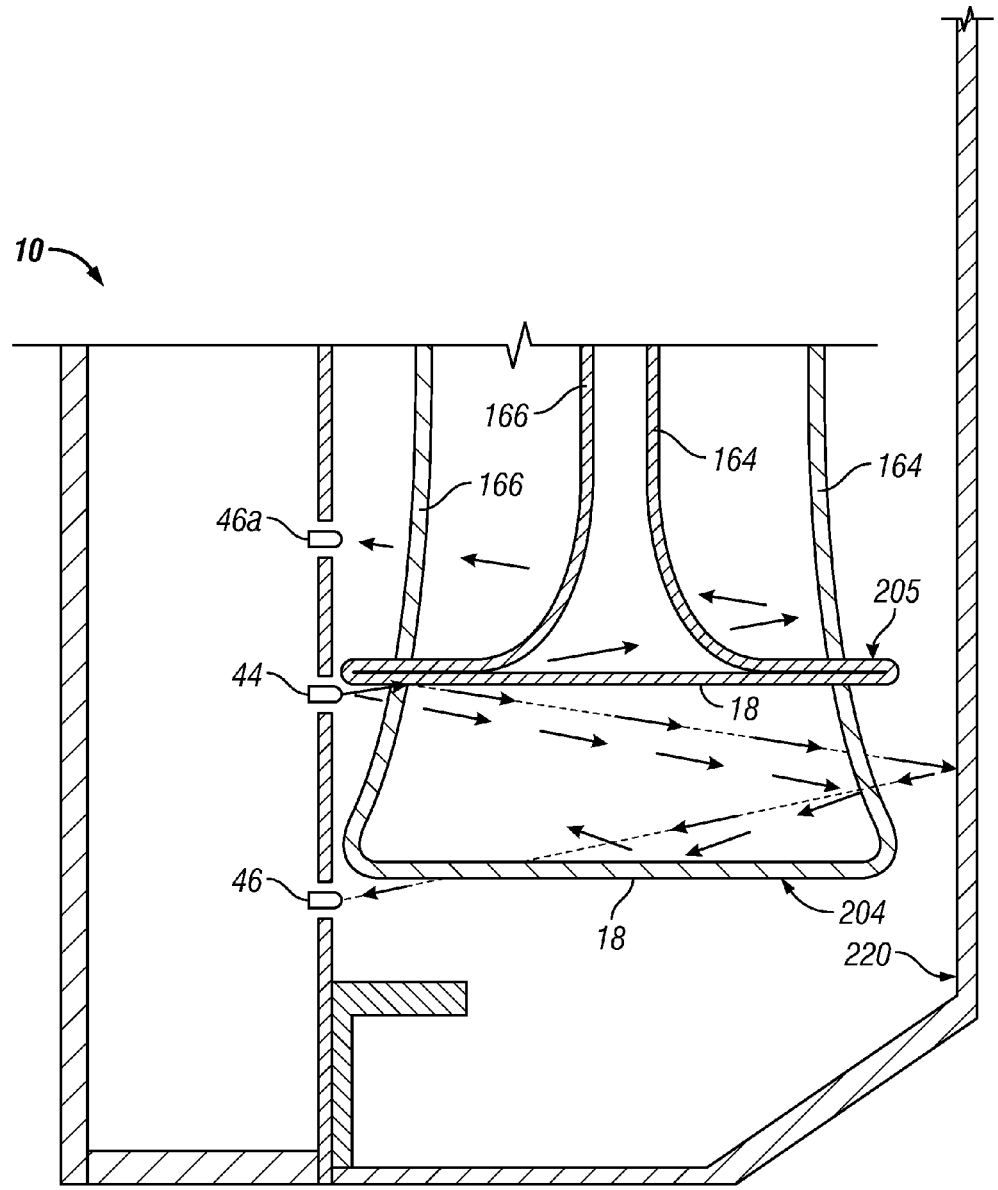
FIG. 34 is a cross-sectional view similar to FIG. 33, however, showing a ninth embodiment which has an alternate arrangement for emitters and sensors.

Reference is made to FIG. 34 which illustrates a modification of the embodiment illustrated in FIG. 33 so as to provide a secondary sensor 46a at a height above the emitter 44. In FIG. 34, profile 205 for the bottle is shown at a point when the bottom 18 of the bottle has been moved upwardly to above the height of the emitter 44. FIG. 34 will have the same manner of sensing and operation as in FIG. 33, however, in addition, will be able to sense a change in radiation sensed when the bottom 18 rises above the emitter 44 at which point the upper sensor 46a will no longer receive reflected light. FIG. 34 also illustrates an alternate arrangement in which a front cover 220 is provided to close the front of the housing 11 as between the side plates 30 and 31 and then rearwardly. Such a cover 220 may be provided to prevent unauthorized access to the bottle 12. In the arrangement shown in FIG. 34, once the bottom 18 of the bottle is raised above the emitter 44, radiation from the emitter 44 will be directed onto the cover 220 and reflected back from the cover 220 to be received by the lower sensor 46. The cover 220 may be provided to have a reflective rear surface so as to provide a substantial reflection of radiation to the sensor 46 when the bottom 18 of the bottle out of the path of radiation from the emitter 44, that is, to provide a change in radiation sensed by the sensor 46 as the bottom 18 rises past the emitter 44. A suitable selection of one or more emitters 44 and sensors 46 may be arranged so as to provide for suitable change in reflectance for a collapsing bottle 12 so as to provide reasonable feedback as to when the bottle present, filled and partially or substantially empty.

In accordance with a preferred embodiment, one or more emitters and one or more sensors may be provided so as to provide reasonable sensing of fluid levels in a dispenser whether a collapsing bottle or a non-collapsing bottle may be installed in the dispenser. Where an array of multiple sensors or multiple emitters is provided, the controller may be able to selectively use certain of the emitters and sensors for optimum sensing of fluid levels having regard to the particular nature of the bottle installed as to whether it be collapsible or non-collapsible. The selection of the specific emitters or sensors which are to be used for sensing with any bottle may be controlled automatically as determined by feedback from information sensed, or by feedback based on the nature of the bottle and pump applied to the dispenser, or by manual input.

The eighth, ninth and tenth embodiments shown in FIGS. 22 to 35 illustrates one preferred collapsible bottle 12, however, the invention is not limited to this one collapsible bottle. Collapsible bottles suitable for use are bottles in which a dimension, relative proportion or shape changes in moving from a full position to a collapsed position. Other known collapsible bottles which could be used include the bottles as described in the following U.S. patents, copies of which are incorporated herein by reference: U.S. Pat. No. 7,530,475 to Ophardt, issued May 12, 2009 and U.S. Pat. No. 3,727,703 to Cobb, issued Apr. 17, 1973. A bottle as taught in the U.S. patent to Cobb has the equivalent of a bottom wall in the bottle extend downwardly, that is, to increase the length of the bottle as the bottle is collapsed and such relative downward movement of the bottom of the bottle could be monitored as an indication of the extent to which the bottle is full or empty. Collapsible bottles are known in which the width of the bottle either front to back or side to side decrease with collapsing of the bottle. Radiation may be passed along pathways which in one condition of the bottle permit passage and in another condition do not permit passage and a change in radiation passing along one such pathway as sensed by a sensor can be used to correlate the relative condition of a collapsible bottle as between being full or empty.

The embodiment illustrated in FIG. 21 shows a configuration in which radiation is passed from an emitter outlet 149 at one location on the dispenser through a cavity within the dispenser housing 11 to contain the bottle 12 with such radiation to be received by a sensor inlet 150 at another location on the dispenser and without requiring reflection of the radiation. Such an arrangement is useful in the context of a non-collapsing bottle in determining the difference in radiation transmitted as, for example, when the liquid level is above the path of the radiation as contrasted when the liquid level is below in total or in part of the path of radiation. Such an arrangement is also useful in the context of a collapsible bottle so as to measure the difference in radiation when there is a portion of the bottle in the radiation path between the radiation outlet 149 and the radiation inlet 150 compared to when no portion of the bottle in the radiation path as may occur by the dimensions or shape of a collapsible bottle being changed such that in one condition a portion of the bottle is in the path of radiation and, in another condition, no portion of the bottle is not in the path of radiation.

Figure 35:
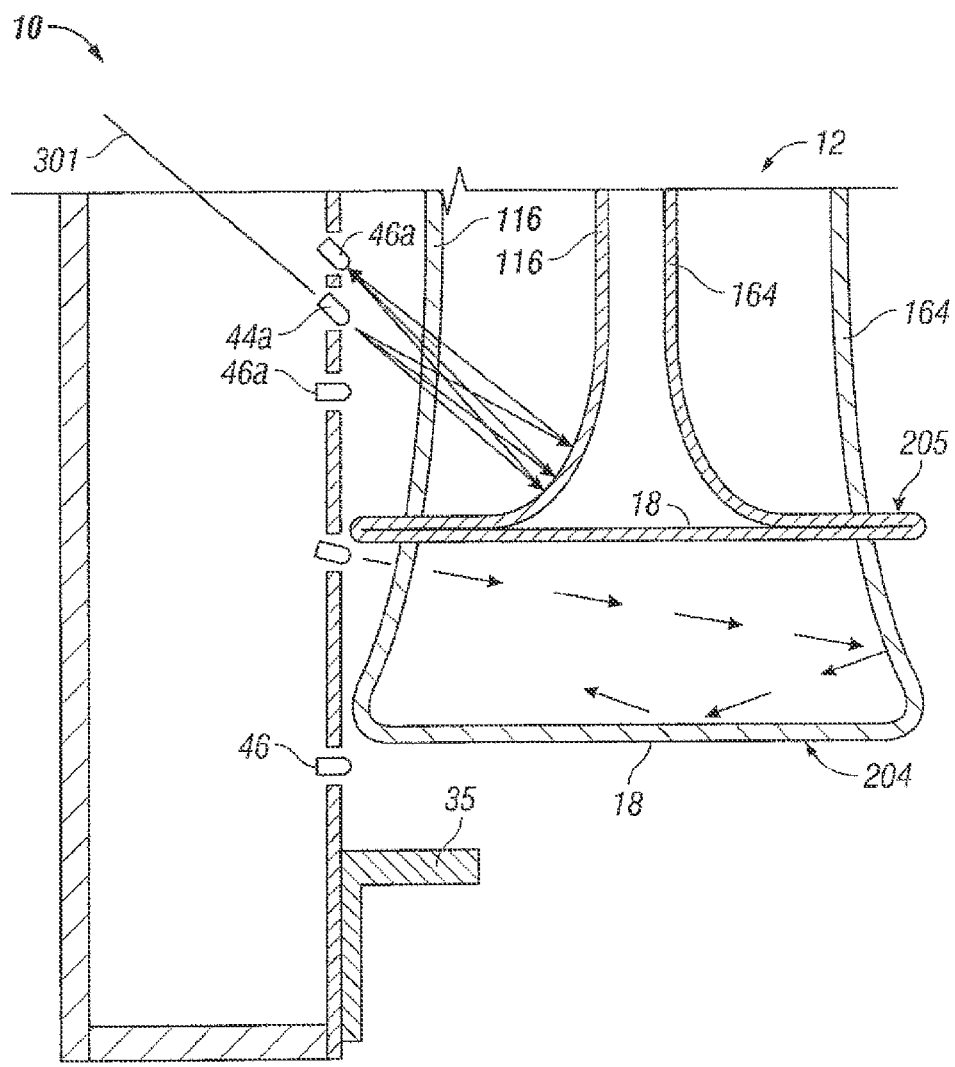
FIG. 35 is a cross-sectional view similar to FIG. 34, however, showing a tenth embodiment.

Reference is made to FIG. 35 which shows a cross-sectional view the same as in FIG. 34, however, with the exception of a provision of an emitter 44a to direct radiation along a radiation path 301 directed at an angle downwardly and forwardly. With collapse of the bottle 12 from the condition of the profile 204 to the condition of the profile 205, the exterior surface of the rear side 166 of the bottle adopts an increasingly concave shape. When the bottle has the profile 205, an increased amount of radiation from the emitter 44 is reflected back to the sensor 46a, as compared to when the bottle has the profile 204. The comparative increase in reflected radiation received by the sensor 46a as the shape of the rear side 166 changes is enhanced by suitable location of the emitter 44a and the sensor 46a and directing the radiation from the emitter 44a downwardly at an angle and with the emitter 44a emitting a relatively narrow cone of radiation. FIG. 35 illustrates one arrangement where the changes in radiation reflected from a portion of a bottle can be used to indicate a relative extent to which a collapsible bottle is full.

The invention has been described with reference to preferred embodiments. Many modifications and variations will now occur to a person skilled in the art. For a definition of the invention, reference is made to following claims.

We claim:

1. A dispenser comprising:
   a housing,
   a collapsible bottle containing fluid to be dispensed,
   a pump mechanism to dispense liquid from the bottle,
   the bottle having a first end and a second end, the bottle having an outlet opening at the first end, the bottle closed other than for the outlet opening at the first end,
   on dispensing of liquid through the outlet opening by the pump mechanism, a vacuum is created in the bottle and the bottle collapses as a volume of the bottle decreases and the liquid in the bottle is dispensed,
   the bottle having a length from the first end to the second end which reduces as the volume of the bottle decreases, in a full condition of the bottle when the bottle is filled with the liquid, the volume of the bottle is a first volume and the length of the bottle is a first length, in a second condition of the bottle, the volume is a second volume less than the first volume and the length is a second length less than the first length, the bottle is coupled to the housing at the first end or the bottle with the first end of the bottle fixed to the housing and the second end of the bottle movable relative to the housing as the length of the bottle reduces as the volume of the bottle decreases, the housing carrying a gauging mechanism to estimate the volume of fluid in the bottle, the gauging mechanism comprising:

an emitter of electromagnetic radiation within a range of wavelengths, and a sensor of electromagnetic radiation within the range of wavelengths, the emitter fixedly carried on the housing to emit the radiation towards the bottle;

the sensor fixedly carried on the housing to receive the radiation from the emitter which is reflected from the bottle, wherein the emitter directs radiation in a direction such that:

(a) when the bottle has a length greater than the second length, the radiation emitted by the emitter engages and reflects off a portion of the bottle proximate the second end of the bottle, and (b) when the bottle has a length equal to or less than the second length, the radiation emitted by the emitter does not engage the bottle.

2. A dispenser as claimed in claim 1 wherein:

the bottle is removably coupled to the housing at the first end with the bottle extending downwardly from the first end to the second end, in the full condition When filled with the liquid, the second end is located relative the housing at a first height, in the second condition, the second end is located relative the housing at a second height above the first height.

3. A dispenser as claimed in claim 2 wherein:

the emitter is carried on the housing at an emitter vertical height, and the sensor is carried on the housing at a sensor vertical height different than the emitter vertical height.

4. A dispenser as claimed in claim 3 wherein the emitter vertical height and the sensor vertical height is each at a height below the second height.

5. A dispenser as claimed in claim 2 wherein the emitter is carried on the housing at an emitter vertical height below the second height, and the sensor is carried on the housing at a sensor vertical height not higher than the emitter vertical height.

6. A dispenser as claimed in claim 5 wherein:

the collapsible bottle is removable and replaceable by a non-collapsing container, the container having a first end and a second end, the container having an outlet opening at the first end, the container is removably coupled to the housing at the first end with the container extending downwardly from the first end to the second end with the second end located relative the housing at a height below both the sensor vertical height and the emitter vertical height, on dispensing of liquid through the outlet opening by the pump mechanism, a surface height of an upper surface of the liquid in the container decreases as the liquid in the bottle is dispensed, the wail of the container including window portions permitting electromagnetic radiation within the range of wavelengths to pass through the wall, the window portions including an inlet window and an outlet window, wherein when the container is coupled to the housing:

(a) the inlet window is located relative the housing at an inlet vertical height and an outlet window is located relative the housing at an outlet vertical height different than the inlet vertical height, and (b) the emitter is located outside the container exterior of the exterior wall positioned to direct the electromagnetic radiation onto into the container window, and the sensor is located outside the container exterior of the exterior wall to receive electromagnetic radiation from the emitter which is reflected from the container.

7. A dispenser as claimed in claim 6 wherein the fluid level gauging mechanism includes a controller, the controller controlling the operation of the emitter and sensor so as to periodically and successively perform:

(i) a step of emitting radiation with the emitter and simultaneously sensing the relative level of radiation reflected from the bottle or the container with the sensor to determine a reflected radiation value, (ii) comparing the reflected radiation value in one step (i) to a compared value selected from a pre-selected value and reflected radiation values sensed in another steps (i), and (iii) identifying when a significant change in the sensed radiation values occurs, and characterizing the significant change in the sensed radiation values as an indication that the level of fluid in the bottle or the container is below a vertical height which is a lower of the sensor vertical height and the emitter vertical height.

8. A dispenser as claimed in claim 7 wherein the electromagnetic radiation is infrared radiation.

9. A dispenser as claimed in claim 7 wherein the container wall is a plastic material translucent to the electromagnetic radiation.

10. A dispenser as claimed in claim 6 wherein the container is not collapsible and has an air inlet which permits air to flow into the container during dispensing of liquid from the container so as to not create a vacuum within the container by dispensing of liquid.

11. A dispenser as claimed in claim 1 wherein the bottle is removably coupled to the housing at the first end.

12. A dispenser as claimed in claim 2 wherein the bottle is removably coupled to the housing at the first end.

13. A dispenser comprising:

a housing, a collapsible bottle containing fluid to be dispensed, a pump mechanism to dispense liquid from the bottle, the bottle having a first end and a second end, the bottle having an outlet opening at the first end, the bottle closed other than for the outlet opening at the first end, on dispensing of liquid through the outlet opening by the pump mechanism, a vacuum is created in the bottle and the bottle collapses as a volume of the bottle decreases and the liquid in the bottle is dispensed, the bottle having a length from the first end to the second end which reduces as the volume of the bottle decreases, in a full condition of the bottle when the bottle is filled with the liquid, the volume of the bottle is a first volume and the length of the bottle is a first length, in a second condition of the bottle, the volume is a second volume less than the first volume and the length is a second length k:ss than the first length, the bottle is coupled to the housing at the first end of the bottle with the first end of the bottle fixed to the housing and the second end of the bottle movable relative to the housing as the length of the bottle reduces as the volume of the bottle decreases, the housing carrying a gauging mechanism to estimate the volume of fluid in the bottle, the gauging mechanism comprising:

an emitter of electromagnetic radiation within a range of wavelengths, and a sensor of electromagnetic radiation within the range of wavelengths, the emitter fixedly carried on the housing to emit the radiation towards the bottle;

the sensor fixedly carried on the housing to receive the radiation from the emitter which is reflected from the bottle, the bottle is coupled to the housing at the first end with the bottle extending vertically from the first end to the second end, in the full condition when filled with the liquid, the second end is located relative the housing at a first height, in the second condition, the second end is located relative the housing at a second height spaced from the first height, the emitter is carried on the housing at an emitter vertical height, and the sensor is carried on the housing at a sensor vertical height, the emitter vertical height is at a height between the first height and the second height and the sensor is carried on the housing at a sensor vertical height between the first height and the second height wherein the emitter directs radiation in a direction such that:

(a) when the bottle is coupled to the housing and the botHe has a length greater than the second length, the radiation emitted by the emitter engages and retlects off a portion of the bottle proximate the second end of the bottle, and (b) when the bottle has a length equal to or less than the second length, the radiation emitted by the emitter does not engage the bottle.

14. A dispenser as claimed in claim 13 wherein:

the baffle is coupled to the housing at the first end with the bottle extending downwardly from the first end to the second end, the second height is above the first height, the emitter vertical height is at a height below the second height.

15. A dispenser as claimed in claim 14 wherein the emitter directs radiation in a direction such that:

(a) when the bottle is coupled to the housing and the bottle has a length greater than the second length, the radiation emitted by the emitter engages and reflects off a portion of the bottle proximate the second end of the bottle, and (b) when the bottle has a length equal to or less than the second length, the radiation emitted by the emitter does not engage the bottle.

16. A dispenser as claimed in claim 14 wherein the sensor is carried on the housing at a sensor vertical height not higher than the emitter vertical height.

17. New A dispenser as claimed in claim 14 wherein the sensor vertical height is at a height below the second height.

18. A dispenser as claimed in claim 14 wherein the sensor vertical height is different than the emitter vertical height.

* * * * *